United States Patent [19]
Tachibana et al.

[11] Patent Number: 5,084,429
[45] Date of Patent: Jan. 28, 1992

[54] CATALYSTS FOR POLYMERIZATION OF OLEFINS

[75] Inventors: Masami Tachibana; Toshihiro Uwai; Tetsuya Matsukawa; Teruaki Hayashida, all of Ichiharashi, Japan

[73] Assignee: Chisso Corporation, Osaka, Japan

[21] Appl. No.: 563,613

[22] Filed: Aug. 7, 1990

[30] Foreign Application Priority Data

| Aug. 28, 1989 | [JP] | Japan | 1-220948 |
| Oct. 16, 1989 | [JP] | Japan | 1-268677 |
| Oct. 16, 1989 | [JP] | Japan | 1-268678 |
| Jan. 25, 1990 | [JP] | Japan | 2-15748 |

[51] Int. Cl.$^5$ .............. C08F 4/653; C08F 4/654; C08F 4/68; C08F 4/685
[52] U.S. Cl. .............. 502/113; 502/115; 502/116; 502/119; 502/120; 502/125; 502/126; 526/116; 526/119; 526/124
[58] Field of Search .............. 502/113, 115, 116, 119, 502/120, 125, 126

[56] References Cited

U.S. PATENT DOCUMENTS

| 4,385,161 | 5/1983 | Caunt et al. | 502/126 X |
| 4,612,299 | 9/1986 | Arzoumanidis et al. | 502/115 X |
| 4,771,024 | 9/1988 | Nestlerode et al. | 502/125 X |
| 4,866,022 | 9/1989 | Arzoumanidis et al. | 502/120 |
| 4,988,656 | 1/1991 | Arzoumanidis et al. | 502/120 X |

*Primary Examiner*—Patrick P. Garvin
*Attorney, Agent, or Firm*—Fred Philpitt

[57] ABSTRACT

A catalyst for use in polymerization of olefins which comprises a carrier mainly composed of a magnesium compound precipitated from a solution and a catalytic component supported on the carrier and selected from titanium halides, vanadyl halides and vanadium halides is described. The catalyst is obtained by a process which comprises: (A) mixing (a) at least one magnesium compound with (c) a saturated or unsaturated monohydric or polyhydric alcohol for reaction in dissolved state in the presence of (b) carbon dioxide in an inert hydrocarbon solvent to obtain component (A); (B) subjecting the component (A) to mixing and reaction with (d) a titanium and/or a vanadyl halide and/or a vanadium halide of the general formula, $VX_r(OR^8)_{4-r}$, and also with (e) at least one boron compound, Si compound and/or Siloxane compound thereby obtaining solid product (I); (C) reacting the solid product (I) with (f) a cyclic ether with or without $R^{12}OH$ thereby causing dissolution and re-precipitation to obtain solid product (II); and (D) subjecting the solid product (II) to further reaction with (g) component (B) consisting of a titanium halide and/or a vanadyl halide and/or a vanadium halide, and/or a $SiX_s(OR^9)_{4-s}$, thereby obtaining solid product (III), followed either by further reaction with a mixture of the component (B) and (h) an electron donor or by reaction of (g) with the solid product (III) obtained by the reaction between the solid product (II) and (h) or (h) with (j) electron donor, thereby obtaining solid product (IV) for use as the catalytic component.

13 Claims, 4 Drawing Sheets

5,084,429

CATALYSTS FOR POLYMERIZATION OF OLEFINS

BACKGROUND OF THE INVENTION

1. Field of the Invention

This invention relates to catalysts useful for polymerization of alpha-olefins and more particularly, to a titanium halide catalytic component supported on magnesium compounds and a catalyst system comprising such a supported catalytic component.

2. Description of the Prior Art

Catalysts on magnesium-containing carriers which have high catalytic activity and good stereospecificity have been developed and are known to be suitable for vapor phase polymerization of alpha-olefins because of their advantages that the treatment of the catalyst residue in produced polymer is easy and that removal of App components is not necessary.

In order to ensure good operability, the catalysts for the vapor phase polymerization of alpha-olefins are further required to have a good shape of particles with a narrow distribution of particle size, a good shatter resistance and a high bulk density. One of techniques for obtaining a controlled shape of catalyst particles is described in Japanese Laid-open Patent Application No. 63-54,405 wherein magnesium compounds are dissolved in an alcohol in the presence of carbon dioxide and treated with a mixture of a titanium halide and an organosilane to cause precipitation, to which a cyclic ether compound is added for re-dissolution and recrystallization, thereby obtaining a carrier with a good shape, and the carrier is activated to provide a catalyst.

In the vapor phase polymerization of alpha-olefins wherein secondarily produced rubber components are not extracted in solvent as is different from the suspension polymerization, there are produced a number of copolymers. For the production of adhesive polymers having high rubber contents, it is necessary to keep good fluidity of polymer powder, which in turn requires the polymer powder having a large size. Accordingly, catalytic ingredients having a large particle size are required as bringing about such a large-sized powder.

In general, catalyst particles prepared from a solution by a precipitation method involve the inevitable drawback that although particles of the carrier are uniform with a sharp distribution of particle size, part of the particles is broken in a subsequent activation step. In addition, particles of a larger size are more liable to break. In Japanese Laid-open Patent Application No. 63-54,405, there is the problem that when the particle size is as large as 30μ, the particles are broken in large amounts during the activation treatment such as with titanium halides, so that fine powder increases in amount.

In Japanese Laid-open Patent Application No. 63-54,405, there is described a method for preparing a catalytic component with a good shape wherein alkaline earth metal alcoholates are dissolved as an alcohol solution by the use of carbon dioxide and a silicone compound is used for the formation of a catalytic component, followed by complexing the alkaline earth metal such as magnesium by the use of tetrahydrofuran.

Many methods using silicon compounds for the formation of catalytic components have been attempted, but use of a boron compound instead of the silicon compound has never been disclosed up to now. In Japanese Laid-open Patent Application No. 63-277,204, use of a boron compound in combination with a silicon compound is set forth but the effect of the boron compound is not explained.

We have made intensive studies on an improved method for the preparation of a catalytic system of the type described before wherein the catalytic component is controlled to have small to large sizes and particularly, to have an appropriate shape and an appropriate size distribution especially in large particle size while keeping good polymerization properties such as high activity and high stereoregularity. As a result, it has been found that the breakage of the particles during the preparation process of the catalytic component is prevented thereby forming a well-shaped catalytic component having a sharp size distribution.

In the second aspect of the invention, we have found a method for producing a large-sized supported catalyst wherein a specific type of silane compound, e.g. an alkylsilane alkoxide, is used as a shape control agent at the time of precipitation from solution and wherein when a cyclic ether is added for recrystallization, an alcohol is added by which in the preparation of a catalytic component and, particularly, a particulate catalyst with a large size, the particles suffer little or only a slight degree of degradation during the treatment with titanium halides.

With regard to the third aspect of the invention, we have already proposed a method for producing a supported catalyst wherein a boron compound is used as a shape control agent at the time of precipitation from solution by which in the preparation of a catalytic component and, particularly, a particulate catalyst with a large size, the particles suffer little or only a slight degree of degradation during the treatment with titanium halide. Further studies have been made and, as a result, it has been found that a catalyst with a large size and a better crystal form can be prepared. The present invention is based on this finding.

With regard to the fourth aspect of the invention, we have found a process for preparing a large-sized catalyst of the supported type wherein a specific type of silane compound, i.e. an alkylsilane alkoxide, is used as a shape-controlling agent at the time of precipitation from solution and an alcohol is added to a recrystallization system to which a cyclic ether compound has been added, by which a catalytic ingredient is prepared and particularly, a large-sized catalyst is prepared without any breakage thereof during treatment with titanium halides or with the particles being broken only in small amounts, if any.

SUMMARY OF THE INVENTION

It is accordingly an object of the invention to provide a catalytic component for use in polymerization of alpha-olefins which has high catalytic activity and ensure high stereospecificity, which can be controlled in a large particle size, and wherein the shape and size distribution of the catalytic particles can be properly controlled.

It is another object of the invention to provide a supported catalyst on large-size carrier particles which can be obtained while preventing breakage of particles during the production process of the catalyst and are thus narrow in size distribution and uniform in size.

It is a further object of the invention of the first aspect to provide a catalytic system which is comprised of the catalytic component of the type mentioned above and an organometallic compound and is adapted for use in polymerization or copolymerization of olefins.

The present invention of the first aspect is based on the method disclosed in Japanese Laid-open Patent Application No. 63-54,405 wherein a solid precipitate is formed from an alcohol solution of a magnesium compound by treatment with a titanium halide and is re-precipitated from a solution containing a cyclic ether. The improvement resides in that the re-precipitation is effected in the presence of a boron compound, so that the resultant precipitate of the magnesium compound is unlikely to break and can be prevented from breaking in a subsequent treatment with titanium halide with a sharp size distribution.

More particularly, the above objects can be achieved, according to the invention, by a catalytic component for use in polymerization of olefins which comprises a carrier mainly composed of a magnesium compound precipitated from a solution and a catalytic component supported on the carrier and selected from titanium halides, vanadyl halides and vanadium halides, the catalyst being obtained by a procedure which comprises:

(A) mixing (a) a magnesium compound of the general formula, $Mg(OR^1)_n(OR^2)_{2-n}$ or $MgR^3{}_m(OR^4)_{2-m}$ or a mixture of these compounds wherein $R^1$, $R^2$, $R^3$ and $R^4$ are independently an alkyl group having from 1 to 20 carbon atoms, an aryl group, a cycloalkyl group having from 3 to 20 carbon atoms or an aromatic group having from 5 to 20 carbon atoms, and m and n are independently a value of from 0 to 2, with (c) a saturated or unsaturated monohydric alcohol of the general formula, $R^5OH$, or polyhydric alcohol and each having from 1 to 20 carbon atoms for reaction in dissolved state in the presence of (b) carbon dioxide in an inert hydrocarbon solvent to obtain component (A);

(B) subjecting the component (A) to mixing and reaction with (d) a titanium halide of the general formula, $TiX_p(OR^6)_{4-p}$, wherein X represents Cl or Br, $R^6$ represents an alkyl group having from 1 to 20 carbon atoms, an aryl group or a cycloalkyl group having from 3 to 20 carbon atoms and p is an integer of from 1 to 4, and/or a vanadyl halide of the general formula, $VO_{xq}(OR^7)_{3-q}$, and/or a vanadium halide of the general formula, $VX_r(OR^8)_{4-r}$, wherein each X represents Cl or Br, $R^7$ and $R^8$ are independently an alkyl group having from 1 to 20 carbon atoms, an aryl group or a cycloalkyl group having from 3 to 20 carbon atoms, q is an integer of from 1 to 3 and r is an integer of from 1 to 4, and/or a silane halide of the general formula, $SiX_s(OR^9)_{4-s}$ wherein X represents Cl or Br, $R^9$ represents an alkyl group having from 1 to 20 carbon atoms, an aryl group or a cycloalkyl group having from 3 to 20 carbon atoms, and s is an integer of from 1 to 4, and also with (e) a boron compound of the general formula, $BR^{10}{}_t(OR^{11})_{3-t}$, or a mixture of these boron compounds wherein $R^{10}$ and $R^{11}$ independently represent an alkyl group having from 1 to 20 carbon atoms, an aryl group, a cycloalkyl group having from 3 to 20 carbon atoms, or an aromatic group having from 5 to 20 carbon atoms, and t is a value of from 0 to 3, thereby obtaining solid product (I);

(C) reacting the solid product (I) with (f) a cyclic ether thereby causing dissolution and re-precipitation to obtain solid product (II); and (D) subjecting the solid product (II) to further reaction with (g) component (B) consisting of a titanium halide of the general formula, $TiX_p(OR^6)_{4-p}$, wherein X represents Cl or Br, $R^6$ represents an alkyl group having from 1 to 20 carbon atoms, an aryl group or a cycloalkyl group having from 3 to 20 carbon atoms and p is an integer of from 1 to 4, and/or a vanadyl halide of the general formula, $VO_{xq}(OR^7)_{3-q}$, and/or a vanadium halide of the general formula, $VX_r(OR^8)_{4-r}$, wherein each X represents Cl or Br, $R^7$ and $R^8$ are independently an alkyl group having from 1 to 20 carbon atoms, an aryl group or a cycloalkyl group having from 3 to 20 carbon atoms, q is an integer of from 1 to 3 and r is an integer of from 1 to 4, thereby obtaining solid product (III), followed either by further reaction with a mixture of the component (B) and (h) an electron donor or by reaction of (g) with the solid product (III) obtained by the reaction between the solid product (II) and (h), thereby obtaining solid product (IV) for use as the catalytic component.

It is preferred that in the above catalytic component, the molar ratio of titanium and magnesium is in the range of from 0.5 to 10:1 and the molar ratio of the electron donor and titanium is in the range of from 0.2 to 20:1.

The solid product (IV) obtained above may be further reacted with (g) the component (B) consisting of a titanium halide of the general formula, $TiX_p(OR^6)_{4-p}$, wherein X represents Cl or Br, $R^6$ represents an alkyl group having from 1 to 20 carbon atoms, an aryl group or a cycloalkyl group having from 3 to 20 carbon atoms and p is an integer of from 1 to 4, a vanadyl halide of the general formula, $VO_{xq}(OR^7)_{3-q}$, and a vanadium halide of the general formula, $VX_r(OR^8)_{4-r}$, wherein each X represents Cl or Br, $R^7$ and $R^8$ are independently an alkyl group having from 1 to 20 carbon atoms, an aryl group or a cycloalkyl group having from 3 to 20 carbon atoms, q is an integer of from 1 to 3 and r is an integer of from 1 to 4.

The catalytic component defined above should preferably be used in combination with an organometallic compound with or without further combination with an electron donor as a third ingredient, thereby producing a catalyst system which is particularly useful for use in polymerization of alpha-olefins.

It is a further object of the invention of the second aspect to provide a process for producing a supported catalyst which is adapted for use in polymerization or copolymerization of olefins and, particularly, in vapor phase, and which has a sharp and narrow distribution of size with a large size and have high catalytic activity and high stereoregular polymerization properties.

The above objects can be achieved, according to the invention, by a catalytic component for use in polymerization of olefins which comprises a carrier mainly composed of a magnesium compound precipitated from a solution and a catalytic component supported on the carrier and selected from titanium halides, vanadyl halides and vanadium halides, the catalyst being obtained by a procedure which comprises:

(A) mixing (a) a magnesium compound of the general formula, $Mg(OR^1)_n(OR^2)_{2-n}$ or $MgR^3{}_m(OR^4)_{2-m}$ or a mixture of these compounds wherein $R^1$, $R^2$, $R^3$ and $R^4$ are independently an alkyl group having from 1 to 20 carbon atoms, an aryl group, a cycloalkyl group having from 3 to 20 carbon atoms or an aromatic group having from 5 to 20 carbon atoms, and m and n are independently a value of from 0 to 2, with (c) a saturated or unsaturated monohydric alcohol of the general formula, $R^5OH$, or polyhydric alcohol and each having from 1 to 20 carbon atoms for reaction in dissolved state in the presence of (b) carbon dioxide in an inert hydrocarbon solvent to obtain component (A);

(B) subjecting the component (A) to mixing and reaction with (d) a titanium halide of the general formula, $TiX_p(OR^6)_{4-p}$, wherein X represents Cl or Br, $R^6$ represents an alkyl group having from 1 to 20 carbon atoms, an aryl group or a cycloalkyl group having from 3 to 20 carbon atoms and p is an integer of from 1 to 4, and/or a vanadyl halide of the general formula, $VOX_q(OR^7)_{3-q}$, and/or a vanadium halide of the general formula, $VX_r(OR^8)_{4-r}$, wherein each X represents Cl or Br, $R^7$ and $R^8$ are independently an alkyl group having from 1 to 20 carbon atoms, an aryl group or a cycloalkyl group having from 3 to 20 carbon atoms, q is an integer of from 1 to 3 and r is an integer of from 1 to 4, and/or a silane halide of the general formula, $SiX_s(OR^9)_{4-s}$ wherein X represents Cl or Br, $R^9$ represents an alkyl group having from 1 to 20 carbon atoms, an aryl group or a cycloalkyl group having from 3 to 20 carbon atoms, and s is an integer of from 1 to 4, and also with (e) a silane compound of the general formula, $R^{10}{}_tSi(OR^{11})_{3-t}$, or a mixture of these silane compounds wherein $R^{10}$ and $R^{11}$ independently represent an alkyl group having from 1 to 20 carbon atoms, an aryl group, or a cycloalkyl group having from 3 to 20 carbon atoms, and t is a value of from 0 to 3, thereby obtaining solid product (I);

(C) reacting the solid product (I) with (f) a saturated or unsaturated monohydric alcohol of the general formula, $R^{12}OH$, or polyhydric alcohol and each having from 1 to 20 carbon atoms and (g) a cyclic ether, followed by dissolution and re-precipitation to obtain solid product (II); and (D) subjecting the solid product (II) to further reaction with (h) component (B) consisting of a titanium halide of the general formula, $TiX_p(OR^6)_{4-p}$, wherein X represents Cl or Br, $R^6$ represents an alkyl group having from 1 to 20 carbon atoms, an aryl group or a cycloalkyl group having from 3 to 20 carbon atoms and p is an integer of from 1 to 4, and/or a vanadyl halide of the general formula, $VOX_q(OR^7)_{3-q}$, and/or a vanadium halide of the general formula, $VX_r(OR^8)_{4-r}$, wherein each X represents Cl or Br, $R^7$ and $R^8$ are independently an alkyl group having from 1 to 20 carbon atoms, an aryl group or a cycloalkyl group having from 3 to 20 carbon atoms, q is an integer of from 1 to 3 and r is an integer of from 1 to 4 to obtain solid product (III), followed by further reaction with (i) the component (B) and (j) an electron donor, thereby obtaining solid product (IV) for use as the catalytic component.

The alcohol used in the step (C) should preferably be a linear alcohol having from 2 to 10 carbon atoms. The catalytic component defined above should preferably be used in combination with an organometallic compound with or without further combination with an electron donor as a third ingredient.

It is a further object of the invention of the third aspect to provide a process for producing a supported catalyst which is adapted for use in polymerization or copolymerization of olefins and, particularly, in vapor phase, and which has a sharp and narrow distribution of size with a large size and have high catalytic activity and high stereoregular polymerization properties.

The above objects can be achieved, according to the invention, by a catalytic component for use in polymerization of olefins which comprises a carrier mainly composed of a magnesium compound precipitated from a solution and a catalytic component supported on the carrier and selected from titanium halides, vanadyl halides and vanadium halides, the catalytic component being obtained by a procedure which comprises:

(A) mixing (a) a magnesium compound of the general formula, $Mg(OR^1)_n(OR^2)_{2-n}$ or $MgR^3{}_m(OR^4)_{2-m}$ or a mixture of these compounds wherein $R^1$, $R^2$, $R^3$ and $R^4$ are independently an alkyl group having from 1 to 20 carbon atoms, an aryl group, a cycloalkyl group having from 3 to 20 carbon atoms or an aromatic group having from 5 to 20 carbon atoms, and m and n are independently a value of from 0 to 2, with (c) a saturated or unsaturated monohydric alcohol of the general formula, $R^5OH$, or polyhydric alcohol and each having from 1 to 20 carbon atoms for reaction in dissolved state in the presence of (b) carbon dioxide in an inert hydrocarbon solvent to obtain component (A);

(B) subjecting the component (A) to mixing and reaction with (d) a titanium halide of the general formula, $TiX_p(OR^6)_{4-p}$, wherein X represents Cl or Br, $R^6$ represents an alkyl group having from 1 to 20 carbon atoms, an aryl group or a cycloalkyl group having from 3 to 20 carbon atoms and p is an integer of from 1 to 4, and/or a vanadyl halide of the general formula, $VOX_q(OR^7)_{3-q}$, and/or a vanadium halide of the general formula, $VX_r(OR^8)_{4-r}$, wherein each X represents Cl or Br, $R^7$ and $R^8$ are independently an alkyl group having from 1 to 20 carbon atoms, an aryl group or a cycloalkyl group having from 3 to 20 carbon atoms, q is an integer of from 1 to 3 and r is an integer of from 1 to 4, and/or a silane halide of the general formula, $SiX_3(OR^9)_{4-s}$ wherein X represents Cl or Br, $R^9$ represents an alkyl group having from 1 to 20 carbon atoms, an aryl group or a cycloalkyl group having from 3 to 20 carbon atoms, and s is an integer of from 1 to 4, and also with (e) a boron compound of the general formula, $BR^{10}{}_t(OR^{11})_{3-t}$, or a mixture of these boron compounds wherein $R^{10}$ and $R^{11}$ independently represent an alkyl group having from 1 to 20 carbon atoms, an aryl group, a cycloalkyl group having from 3 to 20 carbon atoms, or an aromatic group having from 5 to 20 carbon atoms, and t is a value of from 0 to 3, thereby obtaining solid product (I);

(C) reacting the solid product (I) with (f) a saturated or unsaturated monohydric alcohol of the general formula, $R^{12}OH$, or polyhydric alcohol and each having from 1 to 20 carbon atoms and (g) a cyclic ether, followed by dissolution and re-precipitation to obtain solid product (II); and (D) subjecting the solid product (II) to further reaction with (h) component (B) consisting of a titanium halide of the general formula, $TiX_p(OR^6)_{4-p}$, wherein X represents Cl or Br, $R^6$ represents an alkyl group having from 1 to 20 carbon atoms, an aryl group or a cycloalkyl group having from 3 to 20 carbon atoms and p is an integer of from 1 to 4, and/or a vanadyl halide of the general formula, $VOX_q(OR^7)_{3-q}$, and/or a vanadium halide of the general formula, $VX_r(OR^8)_{4-r}$, wherein each X represents Cl or Br, $R^7$ and $R^8$ are independently an alkyl group having from 1 to 20 carbon atoms, an aryl group or a cycloalkyl group having from 3 to 20 carbon atoms, q is an integer of from 1 to 3 and r is an integer of from 1 to 4 to obtain solid product (III), followed by further reaction with (i) the component (B) and (j) an electron donor, thereby obtaining solid product (IV) for use as the catalytic component.

The alcohol used in the step (C) should preferably be a linear alkyl alcohol having from 2 to 10 carbon atoms. The catalytic component defined above should preferably be used in combination with an organometallic compound with or without further combination with an electron donor as a third ingredient.

It is a further object of the invention of the fourth aspect to provide a large-sized catalyst of the supported type which is obtained by a process wherein the catalyst particles can be controlled in size while keeping high catalytic activity and good polymerization capability in high steric regularity, thereby giving the large-sized particles with an improved shape and size distribution.

The above objects can be achieved, according to the invention, by a catalytic ingredient for polymerization of olefins which comprises a carrier made primarily of a Mg compound precipitated from its solution and a titanium halide, vanadyl halide or vanadium halide supported on the carrier and which consists essentially of a solid product (IV) obtained by a process which comprises:

(A) mixing (a) a magnesium compound of the general formula, $Mg(OR^1)_n(OR^2)_{2-n}$ or $MgR^3_m(OR^4)_{2-m}$, or a mixture of the magnesium compounds, wherein $R^1$, $R^2$, $R^3$ and $R^4$ independently represent an alkyl group having from 1 to 20 carbon atoms, an aryl group, a cycloalkyl group having from 3 to 20 carbon atoms or an aromatic group having from 5 to 20 carbon atoms, and m and n are independently a value of from 0 to 2, with (c) a saturated or unsaturated monohydric alcohol of the general formula, $R^5OH$, or polyhydric alcohol and each having from 1 to 20 carbon atoms in the presence of (b) carbon dioxide in an inert hydrocarbon solvent for reaction in dissolved state, thereby obtaining ingredient A;

(B) mixing the ingredient A for reaction with (d) a titanium halide of the general formula, $TiX_p(OR^6)_{4-p}$ wherein X represents Cl or Br, $R^6$ represents an alkyl group having from 1 to 20 carbon atoms, an aryl group or a cycloalkyl group having from 3 to 20 carbon atoms, and p is a value of from 1 to 4, and/or a vanadyl halide of the general formula, $VOX_q(OR^7)_{3-q}$, and/or a vanadium halide of the general formula, $VOX_r(OR^8)_{4-r}$, wherein X represents Cl or Br, $R^7$ and $R^8$ independently represent an alkyl group having from 1 to 20 carbon atoms, an aryl group or a cycloalkyl group having from 3 to 20 carbon atoms, q is a value of from 1 to 3 and r is a value of from 1 to 4 and/or a halogenated silane of the general formula, $SiX_s(OR^9)_{4-s}$, wherein X represents Cl or Br, $R^9$ represents an alkyl group having from 1 to 20 carbon atoms, an aryl group or a cycloalkyl group having from 3 to 20 carbon atoms, and s is a value of from 1 to 4, and (e) a siloxane compound having the Si-O-Si bond or a mixture of the siloxane compound and a silane compound of the general formula, $R^{10}_tSi(OR^{11})_{4-t}$, wherein $R^{10}$ and $R^{11}$ independently represent an alkyl group having from 1 to 20 carbon atoms, an aryl group or a cycloalkyl group having from 3 to 20 carbon atoms, and t is a value of from 0 to 4, thereby obtaining solid product (I);

(C) reacting the solid product (I) with (f) a saturated or unsaturated, monohydric alcohol of the general formula, $R^{12}OH$, or polyhydric alcohol and each having from 1 to 20 carbon atoms and (g) a cyclic ether wherein the product (I) is dissolved in and reprecipitated from a mixture of the alcohol and the cyclic ether, thereby obtaining solid product (II); and (D) subjecting the solid product (II) to reaction with (h) an ingredient B consisting of a titanium halide of the general formula, $TiX_p(OR^6)_{4-p}$ wherein X represents Cl or Br, $R^6$ represents an alkyl group having from 1 to 20 carbon atoms, an aryl group or a cycloalkyl group having from 3 to 20 carbon atoms, and p is a value of from 1 to 4, and/or a vanadyl halide of the general formula, $VOX_q(OR^7)_{3-q}$, and/or a vanadium halide of the general formula, $VOX_r(OR^8)_{4-r}$, wherein X represents Cl or Br, $R^7$ and $R^8$ independently represent an alkyl group having from 1 to 20 carbon atoms, an aryl group or a cycloalkyl group having from 3 to 20 carbon atoms, q is a value of from 1 to 3 and r is a value of from 1 to 4, to obtain solid product (III), followed by further reaction with a mixture of (i) the ingredient B and (j) an electron donative material, thereby obtaining solid product (IV).

The alcohol used in the step (C) should preferably be a linear alcohol having from 2 to 10 carbon atoms. Moreover, The catalytic ingredient defined above may be used in combination with an organometallic compound with or without further combination with an electron donative compound used as a third ingredient whereby such combinations are particularly suitable for use as a catalyst for polymerization of alpha-olefins.

BRIEF DESCRIPTION OF THE DRAWING

The four figures are flow charts illustrating processes for preparing catalytic ingredients according to the invention.

DETAILED DESCRIPTION AND EMBODIMENTS OF THE INVENTION

Figure 1:
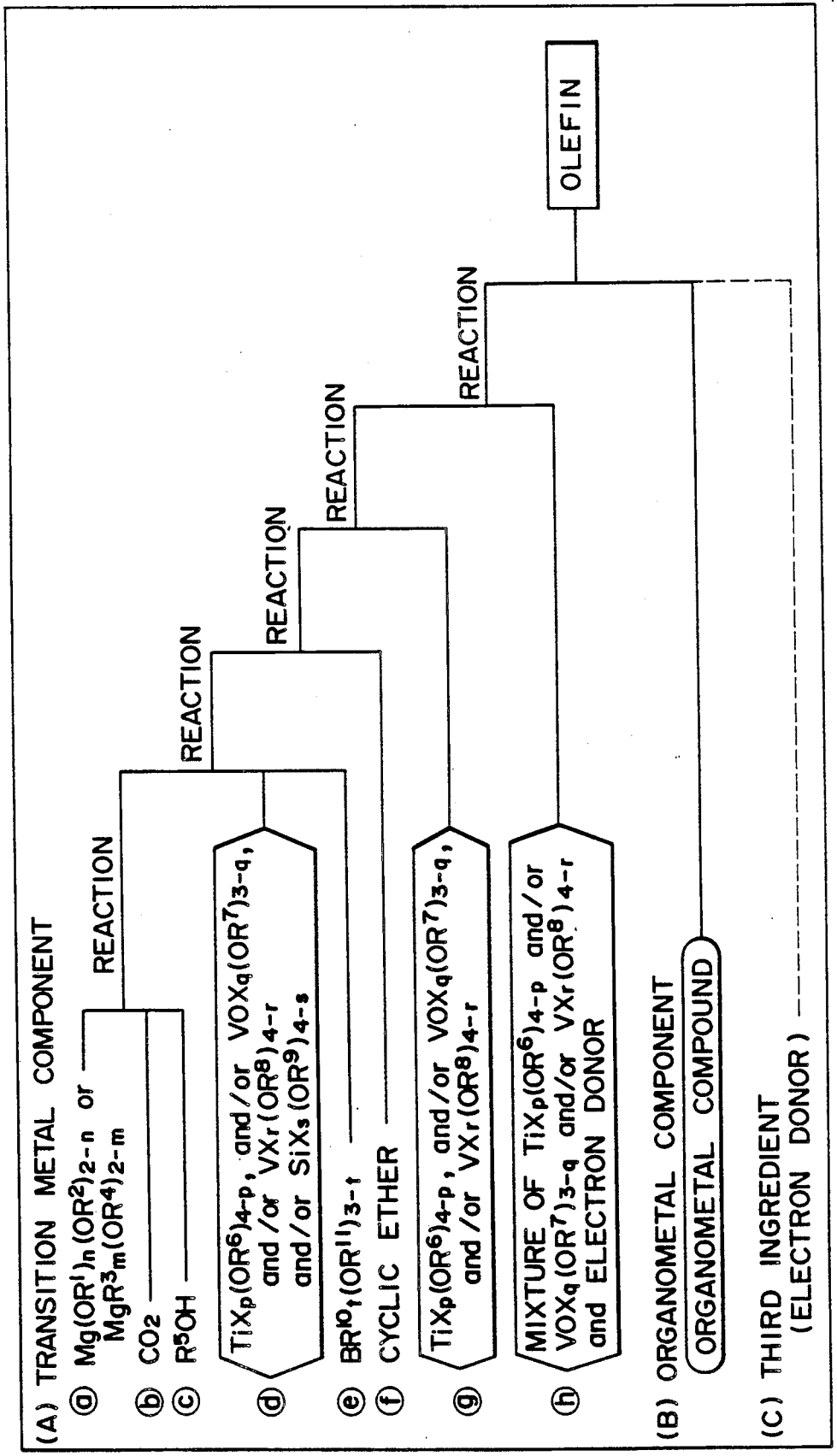
Figure 2:
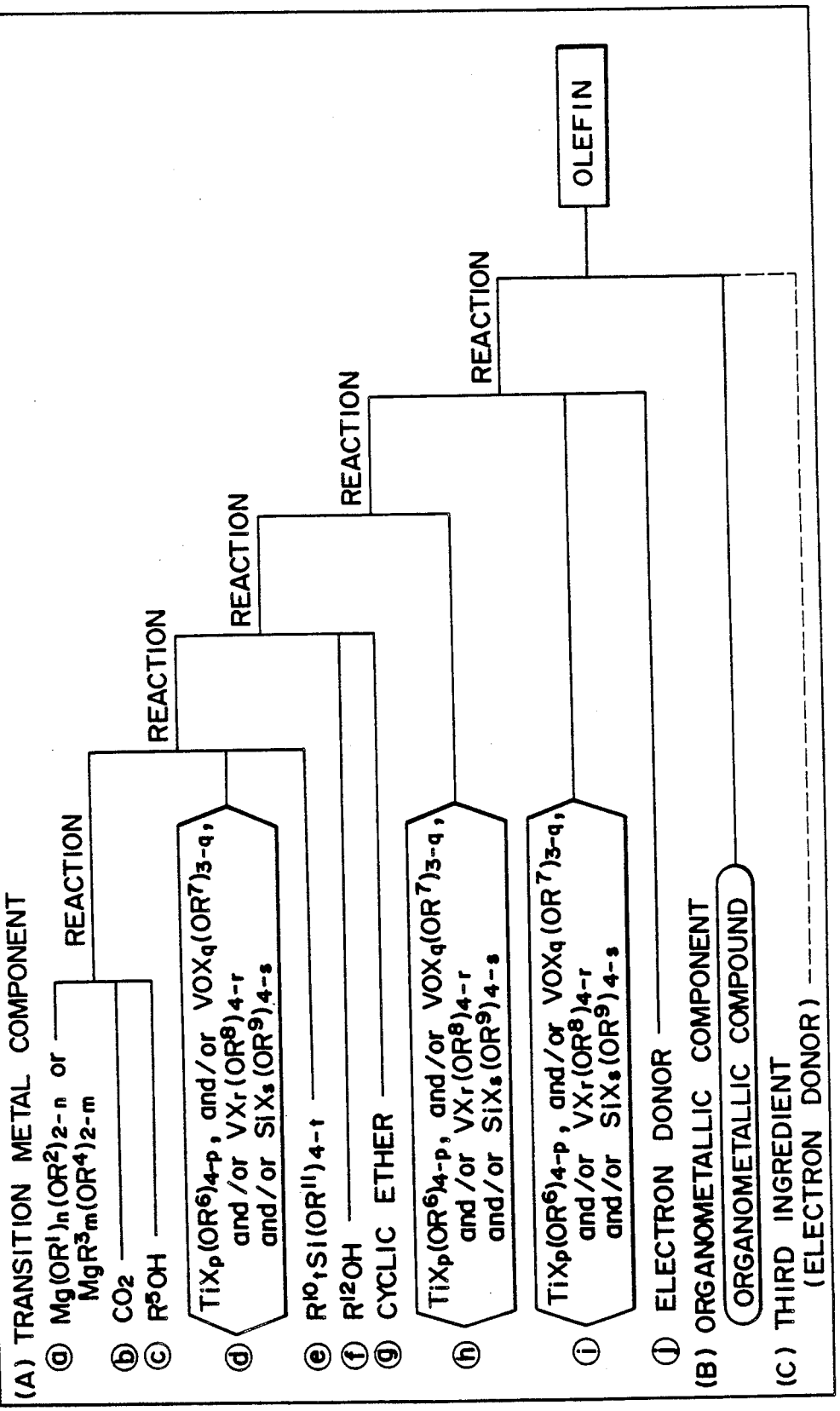
Figure 3:
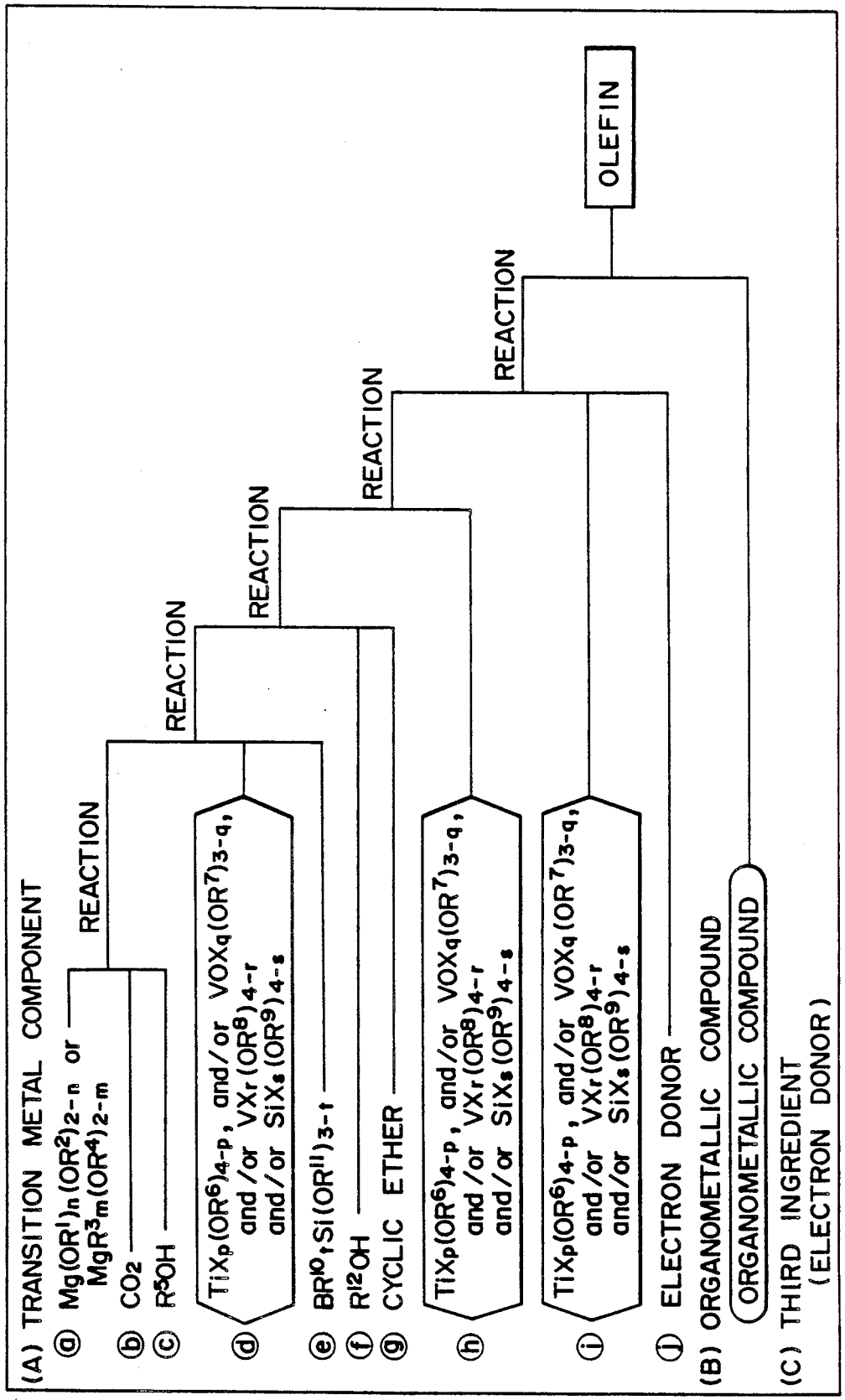

The present invention of the first aspect is now described in more detail.

Initially, the step A is described.

In the step A, (a) a magnesium compound of the general formula, $Mg(OR^1)_n(OR^2)_{2-n}$ or $MgR^3_m(OR^4)_{2-m}$ or a mixture of these compounds wherein $R^1$, $R^2$, $R^3$ and $R^4$ are independently an alkyl group having from 1 to 20 carbon atoms, an aryl group, a cycloalkyl group having from 3 to 20 carbon atoms or an aromatic group having from 5 to 20 carbon atoms, and m and n are independently a value of from 0 to 2, is mixed with (c) saturated or unsaturated monohydric alcohol of the general formula, $R^5OH$, or polyhydric alcohol and each having from 1 to 20 carbon atoms for reaction in dissolved state in the presence of (b) carbon dioxide in an inert hydrocarbon solvent to obtain component (A).

The magnesium alcoholate useful in the present invention includes, for example, $Mg(OCH_3)_2$, $Mg(OC_2H_5)_2$, $Mg(OC_3H_7)_2$, $Mg(OC_4H_9)_2$, $Mg(OCH(CH_3)C_2H_5)_2$, $Mg(OC_8H_{17})_2$, $Mg(OCH_2CH(C_2H_5)C_4H_9)_2$, $Mg(OCH_2CHCH_2)_2$, $Mg(OC_6H_5)_2$, $Mg(OC_6H_{11})_2$, $Mg(OC_6H_4CH_3)_2$, $Mg(OC_{10}H_7)_2$, $Mg(OC_{10}H_6CH_3)_2$, $Mg(OC_{10}H_{17})_2$, $Mg(OC_{10}H_{16}CH_3)_2$, $Mg(OCH_3)(OC_2H_5)$, $Mg(OC_2H_5)(OC_6H_{13})$, $Mg(OC_2H_5)(OC_8H_{17})$, $Mg(OCH_3)(OC_6H_5)$ or the like.

Examples of the alkyl magnesium include $Mg(CH_3)_2$, $Mg(C_2H_5)_2$, $Mg(C_3H_5)_2$, $Mg(C_4H_9)_2$, $Mg(C_6H_{13})_2$, $Mg(C_8H_{17})_2$, $Mg(CHCHC_2H_6)_2$, $Mg(C_6H_5)_2$, $Mg(C_6H_4CH_3)_2$, $Mg(C_6H_{11})_2$, $Mg(C_{10}H_7)_2$, $Mg(CH_3)(C_2H_5)$, $Mg(C_2H_5)(C_6H_{11})$, $Mg(C_3H_7)(C_6H_5)$ and the like. These alkyl magnesium compounds may be used singly or in combination. Aside from these compounds, $Mg(OC_2H_5)(C_4H_9)$ and $Mg(OC_3H_7)(C_6H_5)$ may also be used.

The alcohols used as the ingredient (c) may be aliphatic saturated or unsaturated alcohols. Examples of such alcohols include methanol, ethanol, propanol, isopropanol, isobutanol, t-butanol, octanol, 2-ethylhexanol, cyclohexanol, dodecanol, propenyl alcohol, butenyl alcohol, ethylene glycol, trimethylene glycol and the like. Of these, aliphatic alcohols having from 2 to 10 carbon atoms are preferred.

In the step (B), the component (A) is subjected to reaction with (d) a titanium halide of the general formula, $TiX_p(OR^6)_{4-p}$, wherein X represents Cl or Br, $R^6$ represents an alkyl group having from 1 to 20 carbon atoms, an aryl group or a cycloalkyl group having from 3 to 20 carbon atoms and p is an integer of from 1 to 4, and/or a vanadyl halide of the general formula, $VOX_q(OR^7)_{3-q}$, and/or a vanadium halide of the general formula, $VX_r(OR^8)_{4-r}$, wherein each X represents Cl or Br, $R^7$ and $R^8$ are independently an alkyl group having from 1 to 20 carbon atoms, an aryl group or a cycloalkyl group having from 3 to 20 carbon atoms, q is an integer of from 1 to 3 and r is an integer of from 1 to 4, and/or a silane halide of the general formula, $SiX_s(OR^9)_{4-s}$ wherein X represents Cl or Br, $R^9$ represents an alkyl group having from 1 to 20 carbon atoms, an aryl group or a cycloalkyl group having from 3 to 20 carbon atoms, and s is an integer of from 1 to 4, in the presence of (e) a boron compound of the general formula, $BR^{10}_t(OR^{11})_{3-t}$, or a mixture of these boron compounds wherein $R^{10}$ and $R^{11}$ independently represent an alkyl group having from 1 to 20 carbon atoms, an aryl group, a cycloalkyl group having from 3 to 20 carbon atoms, or an aromatic group having from 5 to 20 carbon atoms, and t is a value of from 0 to 3, thereby obtaining solid product (I).

This reaction is preferably carried out in an aromatic or aliphatic inert hydrocarbon solvent used in appropriate amounts.

Examples of the boron compound (e) include methyl borate, ethyl borate, propyl borate, isopropyl borate, butyl borate, isobutyl borate, t-butyl borate, pentyl borate, octyl borate, 4-chlorobutyl borate, aryl borate, phenyl borate, toluyl borate, diethylcyclohexyl borate, ethyldibutoxyborane, dibutylmonoethoxyborane, triisopropylborane, tributhlborane, tricyclohexylborane and the like.

The B/Mg ratio by mole in the boron compound and the component A used in the step B is generally in the range of 0.1/1 to 2.0/1, preferably 0.3/1 to 1/1.

The titanium halides of the general formula, $TiX_p(OR^6)_{4-p}$, in (d) include titanium tetrachloride, titanium tetrabromide, titanium trichloromethoxide, titanium trichloroethoxide, titanium trichloropropoxide, titanium trichlorobutoxide, titanium trichlorohexoxide, titanium trichlorooctoxide, titanium trichlorocyclohexoxide, titanium trichlorophenoxide, titanium tribromoethoxide, titanium tribromobutoxide, titanium dichlorodiethoxide, titanium dichlorodipropoxide, titanium dichlorodibutoxide, titanium dichlorodioctoxide, titanium dichlorodiphenoxide, titanium dichlorodicyclohexoxide, titanium dibromodiethoxide, titanium dibromodibutoxide, titanium chlorotrimethoxide, titanium chlorotriethoxide, titanium chlorotributoxide, titanium chlorotriphenoxide, titanium bromotriethoxide, titanium bromotriphenoxide and the like.

The titanium halides other than titanium tetrachloride and titanium tetrabromide can be prepared by reaction between titanium tetrahalides and ortho-titanic acid esters. In place of the compounds prepared by the above reaction, there may be used mixtures of titanium tetrahalides and ortho-titanic acid esters. Of these titanium halides, titanium tetrachloride is most preferable.

The vanadyl halides represented by the general formula, $VOX_q(OR^7)_{3-q}$ and vanadium halide of the general formula, $VX_r(OR^8)_{4-r}$, include, for example, vanadyl trichloride, vanadyl tribromide, vanadyl dichloroethoxide, vanadyl dichlorobutoxide, vanadyl dichlorophenoxide, vanadyl dibromomethoxide, vanadyl dibromopropoxide, vanadyl dibromocyclohexoxide, vanadyl chlorodimethoxide, vanadyl chlorodiethoxide, vanadyl chlorodicyclohexoxide, vanadyl bromodipropoxide, vanadyl bromodibutoxide, vanadium tetrachloride, vanadium tetrabromide, vanadium trichloromethoxide, vanadium tribromoethoxide, vanadium trichlorobutoxide, vanadium tribromocyclohexoxide, vanadium trichlorophenoxide, vanadium dichlorodiethoxide, vanadium dibromodibutoxide, vanadium dichlorophenoxide, vanadium chlorotrimethoxide, vanadium bromotriethoxide, vanadium chlorotripropoxide, vanadium bromotributoxide, vanadium chlorotriphenoxide and the like.

The silane halides (d) represented by the general formula, $SiX_s(OR^9)_{4-s}$, include silicon tetrachloride, silicon tetrabromide, silicon tribromomethoxide, silicon trichloroethoxide, silicon trichloropropoxide, silicon trichlorobutoxide, silicon trichlorocyclohexoxide, silicon dichlorodimethoxide, silicon dibromodiethoxide, silicon dichlorodipropoxide, silicon dibromodibutoxide, silicon dichlorodiphenoxide, silicon bromotrimethoxide, silicon chlorotriethoxide, silicon bromotripropoxide, silicon chlorotributoxide and the like. These compounds may be used singly or in combination.

The molar ratio of the total metals in the titanium halide, vanadyl halide, vanadium halide and/or silane halide used in the step B and Mg in the component A is generally in the range of 1/0.3 to 20/1, preferably from 1/0.5 to 5/1.

In the step C, the solid product (I) is dissolved in a solvent containing a cyclic ether (f) and re-precipitated to obtain the solid product (II). By the complete dissolution and re-precipitation, the carrier (solid product (II)) having a uniform shape and size of the particles can be obtained.

In the mother liquor for the precipitation in the step C, there exists the boron compound (e) in the mother liquor of the step B. The presence of the boron compound (e) at the time of the re-precipitation has been found to show a good effect of preventing the particles from shattering or crushing in a subsequent step although the reason for this is not known at the present stage.

Examples of the cyclic ether (f) include tetrahydrofuran, tetrahydropyran, methyltetrahydrofuran, dimethyltetrahydropyran, tetramethyltetrahydrofuran, dioxane, dioxorane, trioxane, pyran, benzopyran, dihydrobenzofuran and the like. Of these, tetrahydrofuran is most preferred.

In the step D, the solid product (II) is reacted with (h) a mixture of (g) the component B consisting of a titanium halide of the general formula, $TiX_p(OR^6)_{4-p}$, a vanadyl halide of the general formula, $VOX_q(OR^7)_{3-q}$ and/or a vanadium halide of the general formula, $VX_r(OR^8)_{4-r}$, and an electron donor, to obtain solid product (III). In the above formulae, X represents Cl or Br, $R^6$, $R^7$ and $R^8$ independently represent an alkyl group having from 1 to 20 carbon atoms, an aryl group or a cycloalkyl group having from 3 to 20 carbon atoms, q is an integer of from 1 to 3 and p and r are independently an integer of from 1 to 4. Prior to or after the above reaction, the solid product (II) or (III) should preferably be treated with (g) the component B.

The component (B) can be selected from the titanium halides, vanadyl halides and vanadium halides set forth with respect to the step B. The component B may be added to the solid product (II) or (III), or the solid product (II) or (III) may be added to the component B.

The electron donor suitable for use in the mixture (h) are aromatic mono and poly-valent carboxylic acid esters. Examples of the aromatic polyvalent carboxylic acid esters include benzene polyvalent carboxylic acid esters and naphthalene polyvalent carboxylic acid esters.

Specific examples of the benzene polyvalent carboxylic acid esters include: mono and diesters of benzylcarboxylic acids such as monomethyl phthalate, dimethyl phthalate, monoethyl phthalate, diethyl phthalate, dipropyl phthalate, mono-n-butyl phthalate, di-n-butyl phthalate, monoisobutyl phthalate, diisobutyl phthalate, di-n-hexyl phthalate, di-2-ethylhexyl phthalate, di-n-octyl phthalate, didecyl phthalate, dibenzyl phthalate, diphenyl phthalate, diethyl isophthalate, dipropyl isophthalate, dibutyl isophthalate, di-2-ethylhexyl isophthalate, diethyl terephthalate, dipropyl terephthalate, dibutyl terephthalate, dioctyl terephthalate, dibenzyl terephthalate, diphenyl terephthalate and the like; mono, di and triesters of benzenetricarboxylic acids such as monobutyl hemimettlitate, dibutyl hemimettlitate, tributyl hemimettlitate, monoethyl trimellitate, dipropyl trimellitate, tributyl trimellitate, diethyl trimesiate, tributyl trimesiate, tri-2-ethylhexyl trimerisiate and the like; mono, di, tri and tetraesters of benzenetetracarboxylic acids such as monomethyl prehnitate, diethyl prehnitate, tripropyl prehnitate, tetrabutyl prehnitate, diethldibutyl prehnitate, dibutyl mellophanate, tetrabutyl pyromellitate, dimethyldipropyl pyromellitate and the like; and mono, di, tri, tetra, penta and hexaesters of benzenepentacarboxylic acids and mellitic acid.

Specific examples of naphthalene polyvalent carboxylic acid esters include mono, di, tri, tetra and pentaesters of naphthalenedicarboxylic acid, naphthalenetricarboxylic acid, naphthalenetetracarboxylic acid and naphthalenepentacarboxylic acid.

Specific examples of the aromatic monocarboxylic acid ester include benzoic acid esters with or without substituents such as methyl benzoate, ethyl benzoate, butyl benzoate, isobutyl benzoate, cyclohexyl benzoate, methyl-p-toluate, ethyl-p-toluate, methyl-p-anisate, butyl-p-anisate, ethyl chlorobenzoate, methyl bromobenzoate and the like.

The amount of the electron donor used in the step D is in the range of from about 0.0001 to 1.0 mole, preferably from 0.005 to 0.8 moles, per gram atom of titanium or vanadium.

The diluents useful in the present invention include aromatic compounds such as benzene, toluene, xylene, ethylbenzene and the like, halogenated aromatic compounds such as chlorobenzene, dibromobenzene and the like, alkanes such as hexane, heptane, octane, nonane, decane, undecane, cyclohexane, methylcyclohexane and the like, halogenated alkanes such as 1,2-dichloroethane, 1,1,2-trichloroethane, carbon tetrachloride and the like, isoparaffin hydrocarbons, kerosine, and the like.

As described hereinbefore, the solid product (III) is obtained by reaction between the solid product (II) and (g) the component B, which is further reacted with (h)

the mixture of the component (B) and an electron donor to obtain solid product (IV) which is the catalytic component of the invention.

The reactions wherein the solid product (IV) is obtained through the solid product (II) may be effected in a reverse order of the reactions set forth above wherein (h) is initially reacted with the solid product (II) to obtain the solid product (III), which is subsequently reacted with (g) to obtain the solid product (IV).

The catalytic component or product of the invention is prepared in an inert gas such as nitrogen or argon or in an atmosphere of alpha-olefin in such a condition that catalyst poisons such as water and oxygen-carbon oxide are eliminated. The purification of the diluent and starting materials used is useful for removing the catalyst poisons from the preparation system of the catalyst. As a result of the preparation, there can be obtained the solid product (IV) which is appropriately used as the catalytic component.

Prior to the use of the solid product (IV), it is preferred to remove unreacted starting materials from the solid product. For the removal, after separation from the diluent, an appropriate solvent such as a liquid hydrocarbon or chlorocarbon is conveniently used to wash the solid therewith within a short time after completion of the preparation reaction. Prolonged contact between the catalytic component and unreacted starting materials may adversely influence the properties of the final catalytic component.

Although not essential, the thus obtained solid product (IV) may be in contact with at least one liquid electron acceptor prior to its use in polymerization. The electron acceptors useful in the present invention should be liquid at a treating temperature and should be those having a high Lewis acidity sufficient to eliminate impurities such as unreacted starting materials and compounds not well combined from the surface of the solid product (IV). Preferable electron acceptors are halides of the metals of Groups III to V of the Periodic Table which are liquid up to temperatures not higher than about 170° C.

Specific examples include $BCl_3$, $AlBr_3$, $TiCl_4$, $TiBr_4$, $SiCl_4$, $GeCl_4$, $SnCl_4$, $PCl_3$ and $SbCl_5$. Preferably, $TiCl_4$ and $SiCl_4$ are mentioned. These electron acceptors may be used in combination. Such an electron acceptor may be used in a miscible diluent.

Although not essential as well, it is preferred that when the solid product is washed with an inert liquid hydrocarbon prior to contact with the electron acceptor, the inert liquid should be substantially removed prior to the contact of the washed solid product with the electron acceptor.

The chemical structure of the catalytic component according to the invention has never been known at present and should preferably comprise from about 1 to about 6 wt % of titanium, from about 10 to about 25 wt % of magnesium and about 45 to about 65 wt % of a halogen. A preferable catalytic component or product prepared according to the invention comprises from about 1.0 to about 3.0 wt % of titanium, from about 15 to about 21 wt % of magnesium and from about 55 to about 65 wt % of chlorine.

The titanium-containing catalytic component of the invention may be pre-polymerized with an alpha-olefin prior to use as a catalytic component for polymerization. In the pre-polymerization, the catalytic component and an organic aluminum compound co-catalyst are contacted with an alpha-olefin under polymerization condition, preferably in the presence of a modifier such as a silane and in an inert hydrocarbon such as hexane.

Preferably, the ratio by weight of the polymer and the catalyst in the pre-polymerized catalytic component is in the range of from about 0.1:1 to about 20:1. By the pre-polymerization, a film of the polymer is formed about individual catalyst particles and can, in most case, improve the morphology, activity, stereospecificity and wear resistance of the particles. The pre-polymerization procedure which is the most useful is described, for example, in U.S. Pat. No. 4,579,836 referred to in the afore-mentioned Japanese Laid-open Patent Application No. 63-54,405.

The titanium-containing catalytic component of the invention is used in a polymerization catalyst containing a cocatalytic component including an alkyl metal of Group II or III and typically one or more modifying compounds.

Useful alkyl metals of Group II or III are of the formula, $MR_m$, wherein M is a metal of Group II or IIIA, each R represents an alkyl group having from 1 to 20 carbon atoms, and m is a valence of M.

Examples of the organometal, M, include magnesium, calcium, zinc, cadmium, aluminium and potassium.

Examples of the suitable alkyl group, R, include methyl, ethyl, butyl, hexyl, decyl, tetradecyl and eicosyl.

From the standpoint of the catalytic properties, preferable alkyl metals of Group II and IIIA are those of magnesium, zinc and aluminium wherein the alkyl moiety should preferably contain from 1 to 12 carbon atoms.

Specific examples of the compounds include $Mg(CH_3)_2$, $Mg(C_2H_5)_2$, $Mg(C_2H_5)(C_4H_9)$, $Mg(C_4H_9)_2$, $Mg(C_6H_{13})_2$, $Mg(C_{12}H_{25})_2$, $Zn(CH_3)_2$, $Zn(C_2H_5)_2$, $Zn(C_4H_9)_2$, $Zn(C_4H_9)_2$, $Zn(C_4H_9)(C_8H_{17})$, $Zn(C_6H_{13})_2$, $Zn(C_{12}H_{25})_2$, $Al(CH_3)_3$, $Al(C_2H_5)_3$, $Al(C_3H_7)_3$, $Al(C_4H_9)_3$, $Al(C_6H_{13})_3$ and $Al(C_{12}H_{25})_3$.

More preferably, alkyl magnesium, zinc or aluminium whose alkyl moiety has from 1 to about 6 carbon atoms are used. Best results are obtained when using trialkyl aluminium wherein each alkyl moiety has from 1 to about 6 carbon atoms, and particularly, triethyl aluminium and triisobutyl aluminium.

The organoaluminium compounds are those compounds having one or more halogens or hydrides and include, for example, ethylaluminium dichloride, diethylaluminium chloride, ethylaluminium sesquichloride and diisobutylaluminium hydride.

Typical catalyst compositions comprise the supported titanium-containing compound according to the invention and an alkyl aluminium compound in combination with a modifier containing an electron donor and, preferably, also with a silane compound. The atomic ratio of aluminium and titanium in this type of catalyst composition is in the range of from 10 to about 500:1, preferably from 30 to about 300:1. The molar ratio of the aluminium compound and the electron donor is in the range of from about 5 to about 40:1. Moreover, the molar ratio of the aluminium compound and the silane compound is preferably in the range of from about 8 to about 30:1.

In order to maximize the catalytic activity and the stereospecificity in the catalyst of the invention, one or more modifiers are preferably used in combination. The modifier should be an electron donor and may be silanes, mineral acids, organometal chalcogenide derivatives of hydrogen sulfide, organic acids, organic acid esters and mixtures thereof.

The organic electron donors useful as a co-catalyst modifier of the invention are organic compounds containing oxygen, silicon, nitrogen, sulfur and/or phosphorus.

Such compounds include organic acids, organic acid anhydrides, organic acid esters, alcohols, ethers, aldehydes, ketones, silanes, amines, amine oxides, amides, thiols, various phosphoric acid esters, amides and the like. If necessary, the organic electron donors may be used in combination.

Preferable organic acids and esters include benzoic acid, halo-benzoic acid, phthalic acid, isophthalic acid, terephthalic acid and alkyl esters thereof whose alkyl moiety has from 1 to 6 carbon atoms, e.g. methyl benzoate, methyl bromobenzoate, ethyl benzoate, ethyl chlorobenzoate, butyl benzoate, isobutyl benzoate, methyl anisate, ethyl anisate, methyl p-toluate, hexyl benzoate, cyclohexyl benzoate, isobutyl phthalate. These compounds give good results with respect to the activity and stereospecificity and can be conveniently used.

Further, aliphatic or aromatic silane modifiers are preferably mentioned as a co-catalyst for the polymerization useful in the present invention. The silanes used as the co-catalyst in the present invention should be alkyl, aryl and/or alkoxy-substituted silanes which have a hydrocarbon moiety having from 1 to about 20 carbon atoms. Preferable examples are silanes of the formula, $SiR_4$, wherein R's independently represent R' or OR' in which R' has from 1 to about 20 carbon atoms.

Preferably aromatic silanes include diphenyldimethoxysilane, phenyltrimethoxysilane, and methylphenyldimethoxysilane. Preferable aliphatic silanes include isobutyltrimethoxysilane, diisobutyldimethoxysilane, diisopropyldimethoxysilane, di-t-butyl-dimethoxysilane and t-butyltrimethoxysilane are mentioned.

The catalyst according to the invention is useful for use in polymerization of alpha-olefins such as ethylene and propylene and is most useful in the stereospecific polymerization of alpha-olefins having three or more carbon atoms such as, for example, propylene, butene-1, pentene-1, 4-methylpentene-1, hexene-1, octene-1, and mixtures thereof with or without ethylene.

When the catalytic component according to the invention is used, polyalpha-olefins having high crystallinity can be prepared by contacting at least one alpha-olefin with the catalytic component under polymerizing conditions. Such conditions include polymerization temperature and time, a pressure of monomer, the manner of removing contaminants for the catalyst, the proper selection of a medium for polymerization in the slurry step, the type of additive for controlling the molecular weight of polymer and other conditions well known in the art.

The polymerization may be effected by suspension, bulk and vapor phase polymerization processes.

The amount of the catalyst may vary depending on the polymerization process, the size of reactor, the type of monomer to be polymerized and other factors known in the art and can be determined with reference to examples described hereinafter. Typically, the catalyst of the invention is used in an amount of from about 0.2 to 0.02 mg per g of produced polymer.

Irrespective of an adopted polymerization process, the polymerization is carried out at a high temperature sufficient to ensure a reasonable polymerization rate and to avoid an unduly long residence time in the reactor but at a temperature which is not so high as to bring about the production of a product with a low level of stereoirregularity caused by too high a polymerization rate. The polymerization temperature is generally in the range of from about 0° C. to about 120° C. and is preferably in the range of from about 20° C. to about 95° C. from the standpoint of good of catalytic properties and high production rates. More preferably, the polymerization is carried out at a temperature ranging from about 50° C. to about 80° C.

The polymerization of alpha-olefins according to the invention is effected at an atmospheric pressure or at a monomer pressure higher than the atmospheric pressure. In general, the pressure of monomer is in the range of about 0.550 kg/cm$^2$G or (over). It will be noted that in the vapor phase polymerization, the monomer pressure must not be less than a vapor pressure of an alpha-olefin to be polymerized at the polymerization temperature.

The polymerization time is generally in the range of from about 0.5 to several hours in a batch process. This time corresponds to an average residence time in continuous processes. The polymerization time of from about 1 hour to about 4 hours is general for the reaction in an autoclave. In the slurry process, the polymerization time can be controlled as desired. The polymerization time of from about 0.5 to several hours is generally in the continuous slurry process.

The diluents suitable for use in the slurry polymerization process include alkanes and cycloalkanes such as pentane, hexane, heptane, n-octane, iso-octane, cyclohexane and methylcyclohexane, alkylaromatic compounds toluene, xylene, ethylbenzene, isopropylbenzene, ethyltoluene, n-propylbenzene, diethylbenzene and mono and di-alkylnaphthalenes, halogenated and hydrogenated aromatic compounds such as chlorobenzene, chloronaphthalene, ortho-dichlorobenzene, tetrahydronaphthalene, decahydronaphthalene and the like, high molecular weight paraffins and mixtures thereof, and other known diluents.

It is often desirable that prior to use, the medium for the polymerization is purified, for example, through distillation, percolation through a molecular sieve, contact with a compound capable of removing trace impurities such as an alkylaluminium compound or other means.

The vapor phase polymerization process which is useful for application of the catalyst of the invention includes both an agitated bed reactor system and a fluidized bed reactor system as described, for example, in U.S. Pat. Nos. 3,957,448, 3,965,083, 3,971,768, 3,970,611, 4,129,701, 4,101,289, 3,652,527 and 4,003,712. These references are cited in the afore-indicated Japanese Laid-open Patent Application No. 63-54,405. A typical vapor phase olefin polymerization reaction system is comprised of a reaction vessel wherein an olefin monomer and the catalytic component are added and which includes an agitated bed for polymer particles to be formed.

Typically, catalytic components are supplied at the same time or separately through one or more valve-controlled ports of the reaction vessel. The olefin monomer is typically fed into the reactor through a circulation gas system wherein the monomer withdrawn as an off-gas and a fresh starting monomer are mixed and fed into the reaction vessel. A quenching liquid which may be a liquid monomer may be added to an olefin being polymerized through the circulation gas system in order to control the temperature.

Irrespective of the manner of polymerization, the polymerization should be effected under such conditions that oxygen, water and other substances capable of acting as a catalyst poison are eliminated.

According to the polymerization process of the invention, the polymerization can be carried out by the use of an additive which is able to control the molecular weight of polymer. For this purpose, hydrogen may be used as is well known in the art.

Although not essentially required, the catalyst may be contacted with water, an alcohol, acetone or other catalyst deactivators by a procedure known in the art at the time of completing or stopping the polymerization or at the time of deactivating the catalyst.

The product prepared according to the process of the invention is usually solid in nature and is mainly composed of an isotactic polyalpha-olefin. The yield of the polymer is high relative to the amount of catalyst and can be obtained without separation of the catalytic residue. The level of a stereoregular side product is significantly low and a useful product is obtained without isolation.

The polymer product prepared in the presence of the catalyst according to the invention can be processed into useful articles by extrusion molding, injection molding and other ordinary techniques.

As will be apparent from the foregoing, the catalyst particles useful for polymerization of olefins are prepared under varying conditions for small and large sizes without breakage of the particles during the production process, or even if the particles are broken, the breakage can be significantly suppressed in a much smaller degree than the case using silane compounds as a shape control agent. Especially, it becomes possible to make a large-sized catalyst having a sharp size distribution.

The large-sized catalyst with a sharp size distribution is kept as a replica for the polymer produced by the polymerization, so that when the polymer is formed as adhesive polymer particles, the fluidity of the polymer particles is drastically improved over the case where smaller polymer particles are produced. This is well known to one skilled in the art. This is why the catalyst of the invention is very useful in preparing copolymers having a high content of rubber component by vapor phase polymerization at high operation efficiencies.

The present invention of the second aspect is now described in more detail.

Initially, the step A is described.

In the step A, (a) a magnesium compound of the general formula, $Mg(OR^1)_n(OR^2)_{2-n}$ or $MgR^3_m(OR^4)_{2-m}$ or a mixture of these compounds wherein $R^1$, $R^2$, $R^3$ and $R^4$ are independently an alkyl group having from 1 to 20 carbon atoms, an aryl group, a cycloalkyl group having from 3 to 20 carbon atoms or an aromatic group having from 5 to 20 carbon atoms, and m and n are independently a value of from 0 to 2, is mixed with (c) saturated or unsaturated monohydric alcohol of the general formula, $R^5OH$, or polyhydric alcohol and each having from 1 to 20 carbon atoms for reaction in dissolved state in the presence of (b) carbon dioxide in an inert hydrocarbon solvent to obtain component (A).

The reaction is carried out at a temperature of from 10° to 200° C., preferably from 20° to 150° C., for a time of from 10 minutes to 24 hours. Preferably, the starting materials are charged at a normal temperature ranging from 10° to 30° C. and then heated to 40° to 150° C. to facilitate dissolution of the magnesium compound.

The magnesium alcoholates useful in the present invention includes, for example, $Mg(OCH_3)_2$, $Mg(OC_2H_5)_2$, $Mg(OC_3H_7)_2$, $Mg(OC_4H_9)_2$, $Mg(OCH(CH_3)C_2H_5)_2$, $2Mg(OC_8H_{17})_2$, $Mg(OCH_2CH(C_2H_5)C_4H_9)_2$, $Mg(OCH_2CHCH_2)_2$, $Mg(OC_6H_5)_2$, $Mg(OC_6H_{11})_2$, $Mg(OC_6H_4CH_3)_2$, $Mg(OC_{10}H_7)_2$, $Mg(OC_{10}H_6CH_3)_2$, $Mg(OC_{10}H_{17})_2$, $Mg(OC_{10}H_{16}CH_3)_2$, $Mg(OCH_3)(OC_2H_5)$, $Mg(OC_2H_5)(OC_6H_{13})$, $Mg(OC_2H_5)(OC_8H_{17})$, $Mg(OCH_3)(OC_6H_5)$ or the like.

Examples of the alkyl magnesium include $Mg(CH_3)_2$, $Mg(C_2H_5)_2$, $Mg(C_3H_7)_2$, $Mg(C_4H_9)_2$, $Mg(C_6H_{13})_2$, $Mg(C_8H_{17})_2$, $Mg(CHCHC_2H_5)_2$, $Mg(C_6H_5)_2$, $Mg(C_6H_4CH_3)_2$, $Mg(C_6H_{11})_2$, $Mg(C_{10}H_7)_2$, $Mg(CH_3)(C_2H_5)$, $Mg(C_2H_5)(C_6H_{11})$, $Mg(C_3H_7)(C_6H_5)$ and the like. These alkyl magnesium compounds may be used singly or in combination. Aside from these compounds, $Mg(OC_2H_5)(C_4H_9)$ and $Mg(OC_3H_7)(C_6H_5)$ may also be used.

The alcohols used as the ingredient (c) may be aliphatic saturated or unsaturated alcohols. Examples of such alcohols include methanol, ethanol, propanol, isopropanol, isobutanol, t-butanol, octanol, 2-ethylhexanol, cyclohexanol, dodecanol, propenyl alcohol, butenyl alcohol, ethylene glycol, trimethylene glycol and the like. Of these, aliphatic alcohols having from 2 to 10 carbon atoms are preferred.

In the step (B), the component (A) is subjected to reaction with (d) a titanium halide of the general formula, $TiX_p(OR^6)_{4-p}$, wherein X represents Cl or Br, $R^6$ represents an alkyl group having from 1 to 20 carbon atoms, an aryl group or a cycloalkyl group having from 3 to 20 carbon atoms and p is an integer of from 1 to 4, and/or a vanadyl halide of the general formula, $VX_q(OR^7)_{3-q}$, and/or a vanadium halide of the general formula, $VX_r(OR^8)_{4-r}$, wherein each X represents Cl or Br, $R^7$ and $R^8$ are independently an alkyl group having from 1 to 20 carbon atoms, an aryl group or a cycloalkyl group having from 3 to 20 carbon atoms, q is an integer of from 1 to 3 and r is an integer of from 1 to 4, and/or a silane halide of the general formula, $SiX_s(OR^9)_{4-s}$ wherein X represents Cl or Br, $R^9$ represents an alkyl group having from 1 to 20 carbon atoms, an aryl group or a cycloalkyl group having from 3 to 20 carbon atoms, and s is an integer of from 1 to 4, in the presence of (e) a silane compound of the general formula, $R^{10}{}_tSi(OR^{11})_{3-t}$, or a mixture of these boron compounds wherein $R^{10}$ and $R^{11}$ independently represent an alkyl group having from 1 to 20 carbon atoms, an aryl group, or a cycloalkyl group having from 3 to 20 carbon atoms, and t is a value of from 0 to 3, thereby obtaining solid product (I).

This reaction is preferably carried out in an aromatic or aliphatic inert hydrocarbon solvent used in appropriate amounts.

The reaction may be conducted by mixing the component A with the silane compound, to which the titanium halide and/or vanadyl halide and/or vanadium halide is added. Preferably, the silane compound and the titanium halide and/or vanadyl halide and/or vanadium halide are first mixed, to which the component A is then added.

The temperature at the time of the mixing may be in the range of from $-40°$ C. to $100°$ C., preferably from $-10°$ to $50°$ C.

Examples of the silane compound (e) include trimethylmonoethoxysilane, trimethylmonopropoxysilane, trimethylmonobutoxysilane, triethylmonomethoxysilane, triethylmonoethoxysilane, triethylmonobutoxysilane, tripropylmonoethoxysilane, tributylmonomethoxysilane, tributylmonoethoxysilane, trihexylmonoethoxysilane, cyclohexyldimethylmonoethoxysilane, dimethyldiethoxysilane, dimethyldipropoxysilane, dimethyldibutoxysilane, diethyldimethoxysilane, diethyldipropoxysilane, diethyldibutoxysilane, cyclohexylmethyldiethoxysilane, methyltriethoxysilane, methyltripropoxysilane, ethyltrimethoxysilane, ethyltributoxysilane, propyltriethoxysilane, butyltrimethoxysilane, allyltrimethoxysilane, allyltriethoxysilane and the like.

The Si/Mg ratio by mole in the silane compound and the component A used in the step B is generally in the range of 0.1/1 to 2.0/1, preferably 0.3/1 to 1/1.

The titanium halides of the general formula, $TiX_p(OR^6)_{4-p}$, in (d) include titanium tetrachloride, titanium tetrabromide, titanium trichloromethoxide, titanium trichloroethoxide, titanium trichloropropoxide, titanium trichlorobutoxide, titanium trichlorohexoxide, titanium trichlorooctoxide, titanium trichlorocyclohexoxide, titanium trichlorophenoxide, titanium tribromoethoxide, titanium tribromobutoxide, titanium dichlorodiethoxide, titanium dichlorodipropoxide, titanium dichlorodibutoxide, titanium dichlorodioctoxide, titanium dichlorodiphenoxide, titanium dichlorodicyclohexoxide, titanium dibromodiethoxide, titanium dibromodibutoxide, titanium chlorotrimethoxide, titanium chlorotriethoxide, titanium chlorotributoxide, titanium chlorotriphenoxide, titanium bromotriethoxide, titanium bromotriphenoxide and the like.

The titanium halides other than titanium tetrachloride and titanium tetrabromide can be prepared by reaction between titanium tetrahalides and ortho-titanic acid esters. In place of the compound prepared by the above reaction, there may be used mixtures of titanium tetrahalides and ortho-titanic acid esters. Of these titanium halides, titanium tetrachloride is most preferable.

The vanadyl halides represented by the general formula, $VOX_q(OR^7)_{3-q}$ and vanadium halide of the general formula, $VX_r(OR^8)_{4-r}$, include, for example, vanadyl trichloride, vanadyl tribromide, vanadyl dichloroethoxide, vanadyl dichlorobutoxide, vanadyl dichlorophenoxide, vanadyl dibromomethoxide, vanadyl dibromopropoxide, vanadyl dibromocyclohexoxide, vanadyl chlorodimethoxide, vanadyl chlorodiethoxide, vanadyl chlorodicyclohexoxide, vanadyl bromodipropoxide, vanadyl bromodibutoxide, vanadium tetrachloride, vanadium tetrabromide, vanadium trichloromethoxide, vanadium tribromoethoxide, vanadium trichlorobutoxide, vanadium tribromocyclohexoxide, vanadium trichlorophenoxide, vanadium dichlorodiethoxide, vanadium dibromodibutoxide, vanadium dichlorophenoxide, vanadium chlorotrimethoxide, vanadium bromotriethoxide, vanadium chlorotripropoxide, vanadium bromotributoxide, vanadium chlorotriphenoxide and the like.

The silane halides represented by the general formula, $SiX_s(OR^9)_{4-s}$, include silicon tetrachloride, silicon tetrabromide, silicon tribromomethoxide, silicon trichloroethoxide, silicon tribromopropoxide, silicon trichlorobutoxide, silicon trichlorocyclohexoxide, silicon dichlorodimethoxide, silicon dibromodiethoxide, silicon dichlorodipropoxide, silicon dibromodibutoxide, silicon dichlorodiphenoxide, silicon bromotrimethoxide, silicon chlorotriethoxide, silicon bromotripropoxide, silicon chlorotributoxide and the like. These compounds may be used singly or in combination.

The molar ratio of the total metals in the titanium halide, vanadyl halide, vanadium halide and/or silane halide used in the step B and Mg in the component A is generally in the range of 1/0.3 to 20/1, preferably from 1/0.5 to 5/1.

In the step C, the solid product (I) is dissolved in a solvent containing (g) a cyclic ether and re-precipitated to obtain the solid product (II). By the complete dissolution and re-precipitation, the carrier (solid product (II)) having a uniform shape and size of the particles can be obtained. In the mother liquor for the precipitation in the step C, there exists the alkoxysilane alkoxide (e) in the mother liquor of the step B. By the addition of the alcohol (f) to the suspension containing the solid product (I), to which the cyclic ether (g) is subsequently added, or by the addition of the cyclic ether along with the alcohol, a carrier in the form of particles (solid product (II)) having a large size can be obtained.

The temperature at the time of the addition of the alcohol (f) and the cyclic ether (g) is in the range of from −40° to 100° C., preferably from −10° to 50° C. After the addition, the temperature is raised to 50° to 150° C. in 1 minute to 10 hours, preferably in 5 minutes to 5 hours, at which the content is maintained for 1 minute to 6 hours, preferably 5 minutes to 3 hours to complete the precipitation.

Examples of the cyclic ether (g) include tetrahydrofuran, tetrahydropyran, methyltetrahydrofuran, dimethyltetrahydropyran, tetramethyltetrahydrofuran, dioxane, dioxorane, trioxane, pyran, benzopyran, dihydrobenzofuran and the like. Of these, tetrahydrofuran is most preferred.

Examples of the alcohol (f) include linear alkyl alcohols such as methanol, ethanol, n-propanol, isopropanol, butanol, isobutanol, t-butanol, pentanol, hexanol, 2-ethylhexanol, octanol and the like, cyclic alkyl alcohols such as cyclopentanol, cyclohexanol and the like, diols such as 1,2-propanediol, 1,4-butanediol and the like, ethylene glycol, trimethylene glycol, propenyl alcohol, butenyl alcohol and the like.

Of these, linear alkyl alcohols having from 2 to 10 carbon atoms such as ethanol, propanol, isopropanol, butanol, 2-ethylhexanol and the like are most preferred.

In the step D, the solid product (II) is reacted with (h) the component B consisting of a titanium halide of the general formula, $TiX_p(OR^6)_{4-p}$, a vanadyl halide of the general formula, $VOX_q(OR^7)_{3-q}$ and/or a vanadium halide of the general formula, $VX_r(OR^8)_{4-r}$, wherein each X represents Cl or Br, $R^6$, $R^7$ and $R^8$ independently represent an alkyl group having from 1 to 20 carbon atoms, an aryl group or a cycloalkyl group having from 3 to 20 carbon atoms, q is an integer of from 1 to 3, and p and r are independently an integer of from 1 to 4, followed by further reaction with a mixture of (i) the component (B) and (j) an electron donor, thereby obtaining solid product (IV).

The component (B) can be selected from the titanium halides, vanadyl halides and vanadium halides set forth with respect to the step B. The mixing of the solid products (II) and (III) and the component B may be carried out by charging the component B into the solid products (II) and (III) or by charging the solid products (II) and (III) into the component (B).

The treating temperatures for the solid products (II) and (III) in the step D are, respectively, in the range of from 40° to 200° C., preferably from 50° to 150° C. and the reaction time is in the range of from 5 minutes to 6 hours, preferably from 10 minutes to 5 hours.

After the reaction, the solid matter is separated by filtration or decantation, after which it is washed with an inert hydrocarbon solvent to remove unreacted matters or side products. The washing with aromatic solvents such as toluene, benzene or xylene prior to the washing with the inert hydrocarbon solvent can further enhance the washing effect.

The electron donors suitable for the treatment are aromatic mono and poly-valent carboxylic acid esters. Examples of the aromatic polyvalent carboxylic acid esters include benzene polyvalent carboxylic acid esters and naphthalene polyvalent carboxylic acid esters.

Specific examples of the benzene polyvalent carboxylic acid esters include monomethyl phthalate, dimethyl phthalate, diethyl phthalate, dipropyl phthalate, mono-n-butyl phthalate, di-n-butyl phthalate, diisobutyl phthalate, di-t-butyl phthalate, di-n-hexyl phthalate, di-2-ethylhexyl phthalate, di-n-octyl phthalate, diphenyl phthalate, dibenzyl phthalate and the like. Specific examples of the aromatic monocarboxylic acid ester include benzoic acid esters with or without substituents such as methyl benzoate, ethyl benzoate, butyl benzoate, isobutyl benzoate, cyclohexyl benzoate, methyl-p-toluate, ethyl-p-toluate, methyl-p-anisate, butyl-p-anisate, ethyl chlorobenzoate, methyl bromobenzoate and the like.

The electron donor used in the step D is in the range of from about 0.0001 to 1.0 mole, preferably from 0.005 to 0.8 moles, per gram atom of titanium or vanadium.

The diluents useful in the present invention include aromatic compounds such as benzene, toluene, xylene, ethylbenzene and the like, halogenated aromatic compounds such as chlorobenzene, dibromobenzene and the like, alkanes such as hexane, heptane, octane, nonane, decane, undecane, cyclohexane, methylcyclohexane and the like, halogenated alkanes such as 1,2-dichloroethane, 1,1,2-trichloroethane, carbon tetrachloride and the like, isoparaffin hydrocarbons, kerosine, and the like.

The catalytic component or product of the invention is prepared in an inert gas such as nitrogen or argon or in an atmosphere of alpha-olefin in such a condition that catalyst poisons such as water and oxygen-carbon oxide are eliminated. The purification of the diluent and starting materials used is useful for removing the catalyst poisons from the preparation system of the catalyst. As a result of the preparation, there can be obtained the solid product (IV) which is appropriately used as the catalytic component.

As will be apparent from the above, according to the invention, there can be prepared a catalyst for use in polymerization of olefins which is in the form of particles having a large size and which has a good crystal form. During the preparation process, the particles suffer little or no breakage, so that a large-sized catalyst with a sharp size distribution can be obtained.

The large-sized catalyst with a sharp size distribution is kept as a replica for the polymer produced by the polymerization, so that when the polymer is formed as adhesive polymer particles, the fluidity of the polymer particles is drastically improved over the case where smaller polymer particles are produced. This is well known to one skilled in the art. This is why the catalyst of the invention is very useful in preparing copolymers having a high content of rubber component by vapor phase polymerization at high operation efficiencies.

The present invention of the third aspect is now described in more detail.

Initially, the step A is described.

In the step A, (a) a magnesium compound of the general formula, $Mg(OR^1)_n(OR^2)_{2-n}$ or $MgR^3_m(OR^4)_{2-m}$ or a mixture of these compounds wherein $R^1$, $R^2$, $R^3$ and $R^4$ are independently an alkyl group having from 1 to 20 carbon atoms, an aryl group, a cycloalkyl group having from 3 to 20 carbon atoms or an aromatic group having from 5 to 20 carbon atoms, and m and n are independently a value of from 0 to 2, is mixed with (c) saturated or unsaturated monohydric alcohol of the general formula, $R^5OH$, or polyhydric alcohol and each having from 1 to 20 carbon atoms for reaction in dissolved state in the presence of (b) carbon dioxide in an inert hydrocarbon solvent to obtain component (A).

The reaction is carried out at a temperature of from 10 to 200° C., preferably from 20° to 150° C., for a time of from 10 minutes to 24 hours. Preferably, the starting materials are charged at a normal temperature ranging from 10° to 30° C. and then heated to 40° to 150° C. to facilitate dissolution of the magnesium compound.

The magnesium alcoholates useful in the present invention includes, for example, $Mg(OCH_3)_2$, $Mg(OC_2H_5)_2$, $Mg(OC_3H_7)_2$, $Mg(OC_4H_9)_2$, $Mg(OCH(CH_3)C_2H_5)_2$, $2Mg(OC_8H_{17})_2$, $Mg(OCH_2CH(C_2H_5)C_4H_9)_2$, $Mg(OCH_2CHCH_2)_2$, $Mg(OC_6H_5)_2$, $Mg(OC_6H_{11})_2$, $Mg(OC_6H_4CH_3)_2$, $Mg(OC_{10}H_7)_2$, $Mg(OC_{10}H_6CH_3)_2$, $Mg(OC_{10}H_{17})_2$, $Mg(OC_{10}H_{16}CH_3)_2$, $Mg(OCH_3)(OC_2H_5)$, $Mg(OC_2H_5)(OC_6H_{13})$, $Mg(OC_2H_5)(OC_8H_{17})$, $Mg(OCH_3)(OC_6H_5)$ or the like.

Examples of the alkyl magnesium include $Mg(CH_3)_2$, $Mg(C_2H_5)_2$, $Mg(C_3H_7)_2$, $Mg(C_4H_9)_2$, $Mg(C_6H_{13})_2$, $Mg(C_8H_{17})_2$, $Mg(CHCHC_2H_5)_2$, $Mg(C_6H_5)_2$, $Mg(C_6H_4CH_3)_2$, $Mg(C_6H_{11})_2$, $Mg(C_{10}H_7)_2$, $Mg(CH_3)(C_2H_5)$, $Mg(C_2H_5)(C_6H_{11})$, $Mg(C_3H_7)(C_6H_5)$ and the like. These alkyl magnesium compounds may be used singly or in combination. Aside from these compounds, $Mg(OC_2H_5)(C_4H_9)$ and $Mg(OC_3H_7)(C_6H_5)$ may also be used.

The alcohols used as the ingredient (c) may be aliphatic saturated or unsaturated alcohols. Examples of such alcohols include methanol, ethanol, propanol, isopropanol, isobutanol, t-butanol, octanol, 2-ethylhexanol, cyclohexanol, dodecanol, propenyl alcohol, butenyl alcohol, ethylene glycol, trimethylene glycol and the like. Of these, aliphatic alcohols having from 2 to 10 carbon atoms are preferred.

In the step (B), the component (A) is subjected to reaction with (d) a titanium halide of the general formula, $TiX_p(OR^6)_{4-p}$, wherein X represents Cl or Br, $R^6$ represents an alkyl group having from 1 to 20 carbon atoms, an aryl group or a cycloalkyl group having from 3 to 20 carbon atoms and p is an integer of from 1 to 4, and/or a vanadyl halide of the general formula, $VOX_q(OR^7)_{3-q}$, and/or a vanadium halide of the general formula, $VX_r(OR^8)_{4-r}$, wherein each X represents Cl or Br, $R^7$ and $R^8$ are independently an alkyl group having from 1 to 20 carbon atoms, an aryl group or a cycloalkyl group having from 3 to 20 carbon atoms, q is an integer of from 1 to 3 and r is an integer of from 1 to 4, and/or a silane halide of the general formula, $SiX_3(OR^9)_{4-s}$ wherein X represents Cl or Br, $R^9$ represents an alkyl group having from 1 to 20 carbon atoms, an aryl group or a cycloalkyl group having from 3 to 20 carbon atoms, and s is an integer of from 1 to 4, in the presence of (e) a boron compound of the general formula, $BR^{10}_t(OR^{11})_{3-t}$, or a mixture of these boron compounds wherein $R^{10}$ and $R^{11}$ independently represent an alkyl group having from 1 to 20 carbon atoms, an aryl group, a cycloalkyl group having from 3 to 20 carbon atoms, or an aromatic group having from 5 to 20 carbon atoms, and t is a value of from 0 to 3, thereby obtaining solid product (I).

This reaction is preferably carried out in an aromatic or aliphatic inert hydrocarbon solvent used in appropriate amounts.

The reaction may be conducted by mixing the component A with the boron compound, to which the titanium halide and/or vanadyl halide and/or vanadium halide is added. Preferably, the boron compound and the titanium halide and/or vanadyl halide and/or vanadium halide are first mixed, to which the component A is then added.

The temperature at the time of the mixing may be in the range of from −40° C. to 100° C., preferably from −10° to 50° C.

Examples of the boron compound (e) include methyl borate, ethyl borate, propyl borate, isopropyl borate, butyl borate, isobutyl borate, t-butyl borate, pentyl borate, octyl borate, 4-chlorobutyl borate, aryl borate, phenyl borate, toluyl borate, diethylcyclohexyl borate, ethyldibutoxyborane, dibutylmonoethoxyborane, triethyl borane, triisopropylborane, tributylborane, tricyclohexylborane and the like.

The B/Mg ratio by mole in the boron compound and the component A used in the step B is generally in the range of 0.1/1 to 2.0/1, preferably 0.3/1 to 1/1.

The titanium halides of the general formula, $TiX_p(OR^6)_{4-p}$, in (d) include titanium tetrachloride, titanium tetrabromide, titanium trichloromethoxide, titanium trichloroethoxide, titanium trichloropropoxide, titanium trichlorobutoxide, titanium trichlorohexoxide, titanium trichlorooctoxide, titanium trichlorocyclohexoxide, titanium trichlorophenoxide, titanium tribromoethoxide, titanium tribromobutoxide, titanium dichlorodiethoxide, titanium dichlorodipropoxide, titanium dichlorodibutoxide, titanium dichlorodioctoxide, titanium dichlorodiphenoxide, titanium dichlorodicyclohexoxide, titanium dibromodiethoxide, titanium dibromodibutoxide, titanium chlorotrimethoxide, titanium chlorotriethoxide, titanium chlorotributoxide, titanium chlorotriphenoxide, titanium bromotriethoxide, titanium bromotriphenoxide and the like.

The titanium halides other than titanium tetrachloride and titanium tetrabromide can be prepared by reaction between titanium tetrahalides and ortho-titanic acid esters. In place of the compounds prepared by the above reaction, there may be used mixtures of titanium tetrahalides and ortho-titanic acid esters. Of these titanium halides, titanium tetrachloride is most preferable.

The vanadyl halides represented by the general formula, $VOX_q(OR^7)_{3-q}$ and vanadium halide of the general formula, $VX_r(OR^8)_{4-r}$, include, for example, vanadyl trichloride, vanadyl tribromide, vanadyl dichloroethoxide, vanadyl dichlorobutoxide, vanadyl dichlorophenoxide, vanadyl dibromomethoxide, vanadyl dibromopropoxide, vanadyl dibromocyclohexoxide, vanadyl chlorodimethoxide, vanadyl chlorodiethoxide, vanadyl chlorodicyclohexoxide, vanadyl bromodipropoxide, vanadyl bromodibutoxide, vanadium tetrachloride, vanadium tetrabromide, vanadium trichloromethoxide, vanadium tribromoethoxide, vanadium trichlorobutoxide, vanadium tribromocyclohexoxide, vanadium trichlorophenoxide, vanadium dichlorodiethoxide, vanadium dibromodibutoxide, vanadium dichlorophenoxide, vanadium chlorotrimethoxide, vanadium bromotriethoxide, vanadium chlorotripropoxide, vanadium bromotributoxide, vanadium chlorotriphenoxide and the like.

The silane halides represented by the general formula, $SiX_s(OR^9)_{4-s}$, include silicon tetrachloride, silicon tetrabromide, silicon tribromomethoxide, silicon trichloroethoxide, silicon tribromoropropoxide, silicon trichlorobutoxide, silicon trichlorocyclohexoxide, silicon dichlorodipropoxide, silicon dibromodibutoxide, silicon dichlorodiphenoxide, silicon bromotrimethoxide, silicon chlorotriethoxide, silicon bromotripropoxide, silicon chlorotributoxide and the like. These compounds may be used singly or in combination.

The molar ratio of the total metals in the titanium halide, vanadyl halide, vanadium halide and/or silane halide used in the step B and Mg in the component A is generally in the range of 1/0.3 to 20/1, preferably from 1/0.5 to 5/1.

In the step C, the solid product (I) is dissolved in a solvent containing (g) a cyclic ether and re-precipitated to obtain the solid product (II). By the complete dissolution and re-precipitation, the carrier (solid product (II)) having a uniform shape and size of the particles can be obtained. In the mother liquor for the precipitation in the step C, there exists the boron compound (e) in the mother liquor of the step B. The presence of the boron compound at the time of the re-precipitation has been found to show a good effect of preventing the particles from shattering or crushing in a subsequent step although the reason for this is not known at the present stage. The addition of the alcohol (f) along with the cyclic ether (g) or during the time of from the precipitation of the solid product (I) till the addition of the cyclic ether permits the formation of the carrier (solid product (II)) having a large particle size.

The temperature at the time of the addition of the alcohol (f) and the cyclic ether (g) is in the range of from $-40°$ to $100°$ C., preferably from $-10°$ to $50°$ C. After the addition, the temperature is raised to $50°$ to $150°$ C. in 1 minute to 10 hours, preferably in 5 minutes to 5 hours, at which the content is maintained for 1 minute to 6 hours, preferably 5 minutes to 3 hours to complete the precipitation.

Examples of the cyclic ether (g) include tetrahydrofuran, tetrahydropyran, methyltetrahydrofuran, dimethyltetrahydropyran, tetramethyltetrahydrofuran, dioxane, dioxorane, trioxane, pyran, benzopyran, dihydrobenzofuran and the like. Of these, tetrahydrofuran is most preferred.

Examples of the alcohol (f) include linear alkyl alcohols such as methanol, ethanol, n-propanol, isopropanol, butanol, isobutanol, t-butanol, pentanol, hexanol, 2-ethylhexanol, octanol and the like, cyclic alkyl alcohols such as cyclopentanol, cyclohexanol and the like, diols such as 1,2-propanediol, 1,4-butanediol and the like, ethylene glycol, trimethylene glycol, propenyl alcohol, butenyl alcohol and the like.

Of these, linear alkyl alcohols having from 2 to 10 carbon atoms such as ethanol, propanol, isopropanol, butanol, 2-ethylhexanol and the like are most preferred.

In the step D, the solid product (II) is reacted with (h) the component B consisting of a titanium halide of the general formula, $TiX_p(OR^6)_{4-p}$, a vanadyl halide of the general formula, $VOX_q(OR^7)_{3-q}$ and/or a vanadium halide of the general formula, $VX_r(OR^8)_{4-r}$, wherein each X represents Cl or Br, $R^6$, $R^7$ and $R^8$ independently represent an alkyl group having from 1 to 20 carbon atoms, an aryl group or a cycloalkyl group having from 3 to 20 carbon atoms, q is an integer of from 1 to 3, and p and r are independently an integer of from 1 to 4, followed by further reaction with a mixture of (i) the component (B) and (j) an electron donor, thereby obtaining solid product (IV).

The component (B) can be selected from the titanium halides, vanadyl halides and vanadium halides set forth with respect to the step B. The mixing of the solid products (II) and (III) and the component B may be carried out by charging the component B into the solid products (II) and (III) or by charging the solid products (II) and (III) into the component (B).

The treating temperatures for the solid products (II) and (III) in the step D are, respectively, in the range of from $40°$ to $200°$ C., preferably from $50°$ to $150°$ C. and the reaction time is in the range of from 5 minutes to 6 hours, preferably from 10 minutes to 5 hours.

After the reaction, the solid matter is separated by filtration or decantation, after which it is washed with an inert hydrocarbon solvent to remove unreacted matters or side products. The washing with aromatic solvents such as toluene, benzene or xylene prior to the washing with the inert hydrocarbon solvent can further enhance the washing effect.

The electron donors suitable for the treatment are aromatic mono and poly-valent carboxylic acid esters. Examples of the aromatic polyvalent carboxylic acid esters include benzene polyvalent carboxylic acid esters and naphthalene polyvalent carboxylic acid esters. Specific examples of the benzene polyvalent carboxylic acid esters include monomethyl phthalate, dimethyl phthalate, diethyl phthalate, dipropyl phthalate, mono-n-butyl phthalate, di-n-butyl phthalate, diisobutyl phthalate, di-t-butyl phthalate, di-n-hexyl phthalate, di-2-ethylhexyl phthalate, di-n-octyl phthalate, diphenyl phthalate, dibenzyl phthalate and the like. Specific examples of the aromatic monocarboxylic acid ester include benzoic acid esters with or without substituents such as methyl benzoate, ethyl benzoate, butyl benzoate, isobutyl benzoate, cyclohexyl benzoate, methyl-p-toluate, ethyl-p-toluate, methyl-p-anisate, ethyl-p-anisate, butyl-p-anisate, ethyl chlorobenzoate, methyl bromobenzoate and the like.

The electron donor used in the step D is in the range of from about 0.0001 to 1.0 mole, preferably from 0.005 to 0.8 moles, per gram atom of titanium or vanadium.

The diluents useful in the present invention include aromatic compounds such as benzene, toluene, xylene, ethylbenzene and the like, halogenated aromatic compounds such as chlorobenzene, dibromobenzene and the like, alkanes such as hexane, heptane, octane, nonane, decane, undecane, cyclohexane, methylcyclohexane and the like, halogenated alkanes such as 1,2-dichloroethane, 1,1,2-trichloroethane, carbon tetrachloride and the like, isoparaffin hydrocarbons, kerosine, and the like.

The catalytic component or product of the invention is prepared in an inert gas such as nitrogen or argon or in an atmosphere of alpha-olefin in such a condition that catalyst poisons such as water and oxygen-carbon oxide are eliminated. The purification of the diluent and starting materials used is useful for removing the catalyst poisons from the preparation system of the catalyst. As a result of the preparation, there can be obtained the solid product (IV) which is appropriately used as the catalytic component.

As will be apparent from the above, according to the invention, there can be prepared a catalyst for use in polymerization of olefins which is in the form of particles having a large size and which has a good crystal form. During the preparation process, the particles suffer little or no breakage, so that a large-sized catalyst with a sharp size distribution can be obtained.

The large-sized catalyst with a sharp size distribution is kept as a replica for the polymer produced by the polymerization, so that when the polymer is formed as adhesive polymer particles, the fluidity of the polymer particles is drastically improved over the case where smaller polymer particles are produced. This is well known to one skilled in the art. This is why the catalyst of the invention is very useful in preparing copolymers having a high content of rubber component by vapor phase polymerization at high operation efficiencies.

The catalytic ingredient or system according to the invention of the fourth aspect is obtained by the procedure described above. This procedure is described in detail according to the steps involved therein.

In the step A, a magnesium compound of the general formula, $Mg(OR^1)_n(OR^2)_{2-n}$ or $MgR^3_m(OR^4)_{2-m}$, or a mixture of the magnesium compounds, wherein $R^1$, $R^2$, $R^3$ and $R^4$ independently represent an alkyl group having from 1 to 20 carbon atoms, an aryl group, a cycloalkyl group having from 3 to 20 carbon atoms or an aromatic group having from 5 to 20 carbon atoms, and m and n are independently a value of from 0 to 2, are mixed and reacted, in dissolved state, with (c) a saturated or unsaturated, monohydric alcohol of the general formula, $R^5OH$, or polyhydric alcohol and each having from 1 to 20 carbon atoms in the presence of (b) carbon dioxide in an inert hydrocarbon solvent, thereby obtaining ingredient A.

The reaction is carried out at a temperature of from 10° to 200° C., preferably from 20° to 150° C., for a time of from 10 minutes to 24 hours. Preferably, the starting materials are charged at room temperature ranging from 10° to 30° C. and then heated to 40° to 150° C. in order to facilitate dissolution of the magnesium compound or compounds.

The magnesium alcoholates useful in the present invention include, for example, $Mg(OCH_3)_2$, $Mg(OC_2H_5)_2$, $Mg(OC_3H_7)_2$, $Mg(OC_4H_9)_2$, $Mg(OCH(CH_3)C_2H_5)_2$, $2Mg(OC_8H_{17})_2$, $Mg(OCH_2CH(C_2H_6)C_4H_9)_2$, $Mg(OCH_2CHCH_2)_2$, $Mg(OC_6H_6)_2$, $Mg(OC_6H_{11})_2$, $Mg(OC_6H_4CH_3)_2$, $Mg(OC_{10}H_7)_2$, $Mg(OC_{10}H_6CH_3)_2$, $Mg(OC_{10}H_{17})_2$, $Mg(OC_{10}H_{16}CH_3)_2$, $Mg(OCH_3)(OC_2H_5)$, $Mg(OC_2H_5)(OC_6H_{13})$, $Mg(OC_2H_5)(OC_8H_{17})$, $Mg(OC_3H_7)(OC_6H_5)$ and the like.

Examples of the alkyl magnesium include $Mg(CH_3)_2$, $Mg(C_2H_5)_2$, $Mg(C_3H_7)_2$, $Mg(C_4H_9)_2$, $Mg(C_6H_{13})_2$, $Mg(C_8H_{17})_2$, $Mg(CHCHC_2H_5)_2$, $Mg(C_6H_5)_2$, $Mg(C_6H_4CH_3)_2$, $Mg(C_6H_{11})_2$, $Mg(C_{10}H_7)_2$, $Mg(CH_3)(C_2H_5)$, $Mg(C_2H_5)(C_6H_{11})$, $Mg(C_3H_7)(C_6H_5)$ and the like. These compounds may be used singly or in combination. In addition, $Mg(OC_2H_5)(C_4H_9)$ and $Mg(OC_3H_7)(C_6H_5)$ may also be used.

The alcohols used as the ingredient (c) may be aliphatic saturated and unsaturated alcohols. Examples of the alcohol include methanol, ethanol, propanol, isopropanol, iso-butanol, tertiary butanol, octanol, 2-ethylhexanol, cyclohexanol, dodecanol, propenyl alcohol, butenyl alcohol, ethylene glycol, trimethylene glycol and the like. Of these, aliphatic alcohols having from 2 to 10 carbon atoms are preferred.

In the step B, the ingredient A is reacted, in the presence of (e) a siloxane compound having the Si—O—Si bond or a mixture of the siloxane compound and a silane compound of the general formula, $R^{10}{}_tSi(OR^{11})_{4-t}$, wherein $R^{10}$ and $R^{11}$ independently represent an alkyl group having from 1 to 20 carbon atoms, an aryl group or a cycloalkyl group having from 3 to 20 carbon atoms, and t is a value of from 0 to 4, with (d) a titanium halide of the general formula, $TiX_p(OR^6)_{4-p}$ wherein X represents Cl or Br, $R^6$ represents an alkyl group having from 1 to 20 carbon atoms, an aryl group or a cycloalkyl group having from 3 to 20 carbon atoms, and p is a value of from 1 to 4, and/or a vanadyl halide of the general formula, $VOX_q(OR^7)_{3-q}$, and/or a vanadium halide of the general formula, $VOX_r(OR^8)_{4-r}$, wherein X represents Cl or Br, $R^7$ and $R^8$ independently represent an alkyl group having from 1 to 20 carbon atoms, an aryl group or a cycloalkyl group having from 3 to 20 carbon atoms, q is a value of from 1 to 3 and r is a value of from 1 to 4 and/or a halogenated silane of the general formula, $SiX_s(OR^9)_{4-s}$, wherein X represents Cl or Br, $R^9$ represents an alkyl group having from 1 to 20 carbon atoms, an aryl group or a cycloalkyl group having from 3 to 20 carbon atoms, and s is a value of from 1 to 4, thereby obtaining solid product (I).

The above reaction should preferably be carried out in an aromatic or aliphatic inert hydrocarbon solvent used in appropriate amounts.

Although the mixing order for the reaction may be such that the ingredient A and the siloxane compound or its mixture with the silane compound are first mixed, with which there is mixed the titanium halide and/or vanadyl halide and/or vanadium halide, it is preferred that the siloxane compound is mixed with the titanium halide and/or vanadyl halide and/or vanadium halide, to which the ingredient A is added.

The temperature during the mixing may be in the range of from −40° C. to 100° C. and is preferably in the range of from −10° C. to 50° C.

Examples of the siloxane compound (e) include linear polysiloxanes of the general formula, $R_3Si-(OSiR_2)_n$-$OSiR_3$, wherein R represents an alkyl group having from 1 to 20 carbon atoms, an aryl group, a cycloalkyl group or an aromatic group, and n is a value of from 1 to $10^3$, such as hexamethyldisiloxane, hexaethyldisiloxane, hexabutyrodisiloxane, octamethyltrisiloxane, octaethyltrisiloxane and the like, polyalkylalkoxysiloxanes having an alkoxy group or groups at part thereof such as hexamethyl-1,5-diethoxytrisiloxane, hexaethyl-1,5-dimethoxytrisiloxane and the like, polyalkoxyalkylsiloxanes of the general formula, $R(RO)_2Si-(OSi(OR)_2)_n$-$OSi(OR)_2R$, wherein R and n have, respectively, the same meanings as defined above, such as hexaethoxy-1,5-dimethyltrisiloxane, octaethoxy-1,5-dimethyltrisiloxane and the like, and cyclic polysiloxanes of the general formula, $(OSiR_2)_n$, wherein R and n have, respectively, the same meanings as defined above, such as hexamethylcyclotrisiloxane, octaethylcyclotetrasiloxane and the like.

Examples of the silane compound used by mixing with the above-mentioned siloxane compounds include trimethylmonoethoxysilane, trimethylmonopropoxysilane, trimethylmonobutoxysilane, triethylmonomethoxysilane, triethylmonoethoxysilane, triethylmonobutoxysilane, tripropylmonoethoxysilane, tributylmonomethoxysilane, tributylmonoethoxysilane, trihexylmonoethoxysilane, cyclohexyldimethylmonoethoxysilane, dimethyldiethoxysilane, dimethyldipropoxysilane, dimethyldibutoxysilane, diethyldimethoxysilane, diethyldipropoxysilane, diethyldibutoxysilane, cyclohexylmethyldiethoxysilane, methyltriethoxysilane, methyltripropoxysilane, ethyltrimethoxysilane, ethyltributoxysilane, propyltriethoxysilane, butyltrimethoxysilane, allyltrimethoxysilane, allyltriethoxysilane, and the like.

The molar ratio of Si/Mg in the siloxane compound or its mixture with the silane compound and the ingredient A used in the step B is generally in the range of 1 to 2.0:1, preferably 0.3:1 to 1:1.

The titanium halides (d) of the general formula, $TiX_p(OR^6)_{4-p}$, include, for example, titanium tetrachloride, titanium tetrabromide, titanium trichloride methoxide, titanium trichloride ethoxide, titanium trichloride propoxide, titanium trichloride butoxide, titanium trichloride hexoxide, titanium trichloride octoxide, titanium trichloride cyclohexoxide, titanium trichloride phenoxide, titanium dichloride diethoxide, titanium dichloride dipropoxide, titanium dichloride dibutoxide, titanium dichloride dioctoxide, titanium dichloride diphenoxide, titanium dichloride dicyclohexoxide, titanium dibromide diethoxide, titanium dibromide dibutoxide, titanium chloride tributoxide, titanium chloride triphenoxide, titanium bromide triethoxide, titanium bromide triphenoxide and the like.

The titanium halides other than titanium tetrachloride and titanium tetrabromide can be prepared by reaction between titanium tetrahalides and orthotitanic acid esters. In place of those products obtained by the above reaction, mixtures of titanium tetrahalides and orthotitanic acid esters may be used in the practice of the invention. Of these, titanium tetrachloride is most preferred.

Examples of the vanadyl halides and vanadium halides, respectively, represented by the general formulas, $VOX_q(OR^7)_{3-q}$, and $VOX_r(OR^8)_{4-r}$, include vanadyl trichloride, vanadyl tribromide, vanadyl dichloride ethoxide, vanadyl dibromide methoxide, vanadyl dichloride ethoxide, vanadyl dichloride butoxide, vanadyl trichloride phenoxide, vanadyl dibromide methoxide, vanadyl dibromide propoxide, vanadyl dibromide cyclohexoxide, vanadyl chloride dimethoxide, vanadyl chloride diethoxide, vanadyl chloride dicyclohexoxide, vanadyl bromide dipropoxide, vanadyl bromide dibutoxide, vanadium tetrachloride, vanadium tetrabromide, vanadium trichloride methoxide, vanadium trichloride ethoxide, vanadium trichloride butoxide, vanadium tribromide cyclohexoxide, vanadium trichloride phenoxide, vanadium dichloride diethoxide, vanadium dibromide dibutoxide, vanadium dichloride diphenoxide, vanadium chloride trimethoxide, vanadium bromide triethoxide, vanadium chloride tripropoxide, vanadium bromide tributoxide, vanadium chloride triphenoxide and the like.

Examples of the halogenated silanes (d) of the general formula, $SiX_s(OR^9)_{4-s}$, include silicon tetrachloride, silicon tetrabromide, silicon tribromide methoxide, silicon trichloride ethoxide, silicon tribromide propoxide, silicon trichloride butoxide, silicon trichloride cyclohexoxide, silicon dichloride dimethoxide, silicon dibromide diethoxide, silicon dichloride dipropoxide, silicon dibromide dibutoxide, silicon dichloride diphenoxide, silicon bromide trimethoxide, silicon chloride triethoxide, silicon bromide tripropoxide, silicon chloride tributoxide, and the like. These may be used singly or in combination.

The molar ratio of the metals in total in the titanium halide or/and vanadyl halide or/and vanadium halide or/and halogenated silane and Mg in the ingredient A used in the step B is generally in the range of 1:0.3 to 20:1, preferably 1:0.5 to 5:1.

In the step C, the solid product (I) obtained in the step B is dissolved in a solvent containing the cyclic ether (g) and re-precipitated to obtain solid product (II). Part or all of the solid product is dissolved and re-precipitated to obtain a carrier (solid product (II)) having uniform particle shape and size. In the mother liquor for the precipitation in the step C, the siloxane compound (e) contained in the mother liquor of the step B exists. The alcohol (f) may be added to the suspension containing the solid product (I), after which the cyclic ether (g) is added. Alternatively, the alcohol and cyclic ether are added at the same time. As a result, there can be obtained the carrier particles (solid product (II)) with a large size.

The temperature at which the alcohol (f) and cyclic ether (g) are added is in the range of from $-40°$ to $100°$ C., preferably from $-10°$ to $50°$ C. After the addition, the temperature is raised to $50°$ to $150°$ C. in 1 minute to 10 hours, preferably 5 minutes to 5 hours, at which the reaction system is kept for 1 minute to 6 hours, preferably from 5 minutes to 3 hours, thereby completing the precipitation.

Examples of the cyclic ether (g) include tetrahydrofuran, tetrahydropyran, methyltetrahydrofuran, dimethyltetrahydropyran, tetramethyltetrahydrofuran, dioxane, dioxorane, trioxane, pyran, benzopyran, dihydrobenzofuran and the like. Of these, tetrahydrofuran is most preferred.

Examples of the alcohol include linear alkyl alcohols such as methanol, ethanol, n-propanol, iso-propanol, butanol, iso-butanol, tertiary butanol, pentanol, hexanol, 2-ethylhexanol, octanol and the like, cyclic alkyl alcohols such as cyclopentanol, cyclohexanol and the like, diols such as 1,2-propanediol, 1,4-butanediol and the like, ethylene glycol, trimethylene glycol, propenyl alcohol, butenyl alcohol and the like.

Of these, a linear alkyl alcohol having from 2 to 10 carbon atoms, such as ethanol, propanol, butanol, 2-ethylhexanol or the like, is most preferred.

In the step D, the solid product (II) the solid product (II) is reacted with (h) the ingredient B including the titanium halide of the general formula, $TiX_p(OR^6)_{4-p}$, and/or the vanadyl halide of the general formula, $VOX_q(OR^7)_{3-q}$, and/or the vanadium halide of the general formula, $VOX_r(OR^8)_{4-r}$, wherein each X represents Cl or Br, $R^6$, $R^7$ and $R^8$ independently represent an alkyl group having from 1 to 20 carbon atoms, an aryl group or a cycloalkyl group having from 3 to 20 carbon atoms, q is a value of from 1 to 3 and p and r are, respectively, a value of from 1 to 4 and further reacted with a mixture of the ingredient B (i) and an electron donative material or compound (j) to obtain solid product (IV).

The ingredient B can be selected from the titanium halide, vanadyl halide and vanadium halide described with respect to the step B. The mixing of the solid products (II) and (III) and the ingredient B may be effected by adding the ingredient B to the solid products (II) and (III) or by adding the solid products (II) and (III) to the ingredient B.

The treating temperatures of the solid products (II) and (III) in the step D may be in the range of from $40°$ to $200°$ C., preferably from $50°$ to $150°$ C. for each case.

The reaction time for both products is in the range of from 5 minutes to 6 hours, preferably from 10 minutes to 5 hours.

After completion of the reaction, the resultant solid product is separated by filtration or decantation, after which it is washed with an inert hydrocarbon solvent to remove unreacted compounds or side products therefrom. The washing effect may be further facilitated by washing the product with an aromatic solvent such as toluene, benzene, xylene or the like prior to the washing with the inert hydrocarbon solvent.

The electron donative compounds suitable for the above treatment include aromatic mono- and polycarboxylic acid esters. Examples of the polycarboxylic acid esters include benzene polycarboxylic acid esters, naphthalene polycarboxylic acid esters and the like.

Specific examples include benzene polycarboxylic acid esters such as monomethyl phthalate, dimethyl phthalate, diethyl phthalate, dipropyl phthalate, mono-n-butyl phthalate, di-n-butyl phthalate, diisobutyl phthalate, di-tert-butyl phthalate, di-n-hexyl phthalate, di-2-ethylhexyl phthalate, di-n-octyl phthalate, diphenyl phthalate, dibenzyl phthalate and the like, and aromatic monocarboxylic acid esters such as benzoates with or without a substituent, e.g. methyl benzoate, ethyl benzoate, butyl benzoate, iso-butyl benzoate, cyclohexyl benzoate, methyl p-toluate, ethyl p-toluate, methyl p-anisate, butyl p-anisate, ethyl chlorobenzoate, methyl bromobenzoate.

The electron donative compounds used in the step D is used in an amount of about 0.0001 to 1.0 mole, preferably from 0.005 to 0.8 moles, per gram atom of titanium or vanadium.

The diluents useful in the present invention are, for example, aromatic hydrocarbons such as benzene, toluene, xylene, ethylbenzene and the like, halogenated aromatic hydrocarbons such as chlorobenzene, dibromobenzene and the like, alkanes such as hexane, heptane, octane, nonane, decane, undecane, cyclohexane, methylcyclohexane and the like, halogenated alkanes such as 1,2-dichloroethane, 1,1,2-trichloroethane, carbon tetrachloride and the like, iso-paraffin hydrocarbons, kerosine, and the like.

The catalytic ingredient is prepared in an atmosphere of an inert gas such as nitrogen or argon gas or an alpha-olefin under conditions where catalyst poisons such as water, oxygen-carbon oxide and the like are eliminated. The diluent and the starting materials used should favorably be purified in order to remove catalyst poisons from the preparation system for the catalyst. According to the invention, the solid product (IV) which is suitable for use as the catalytic ingredient can thus be obtained.

In this manner, the catalyst in the form of particles which have a large size suitable for use in polymerization of olefins can be obtained while keeping a good crystal shape without breakage of the particles into finer powder during the production process or with a very reduced degree of the breakage, if any. Thus, a large-sized catalyst having a sharp size distribution can be obtained. The large-sized catalyst with a sharp size distribution is advantageous in that the catalyst particles are kept as a replica for polymer particles produced by the polymerization. As is well known in the art, when the particles of polymer which are adhesive in nature are large in size, the flowability is drastically improved over that in the case where small-sized catalyst particles are used. Thus, the large-sized catalyst particles are very useful in preparing copolymers having a high content of rubber component by vapor phase polymerization in a high operation efficiency.

Figure 4:
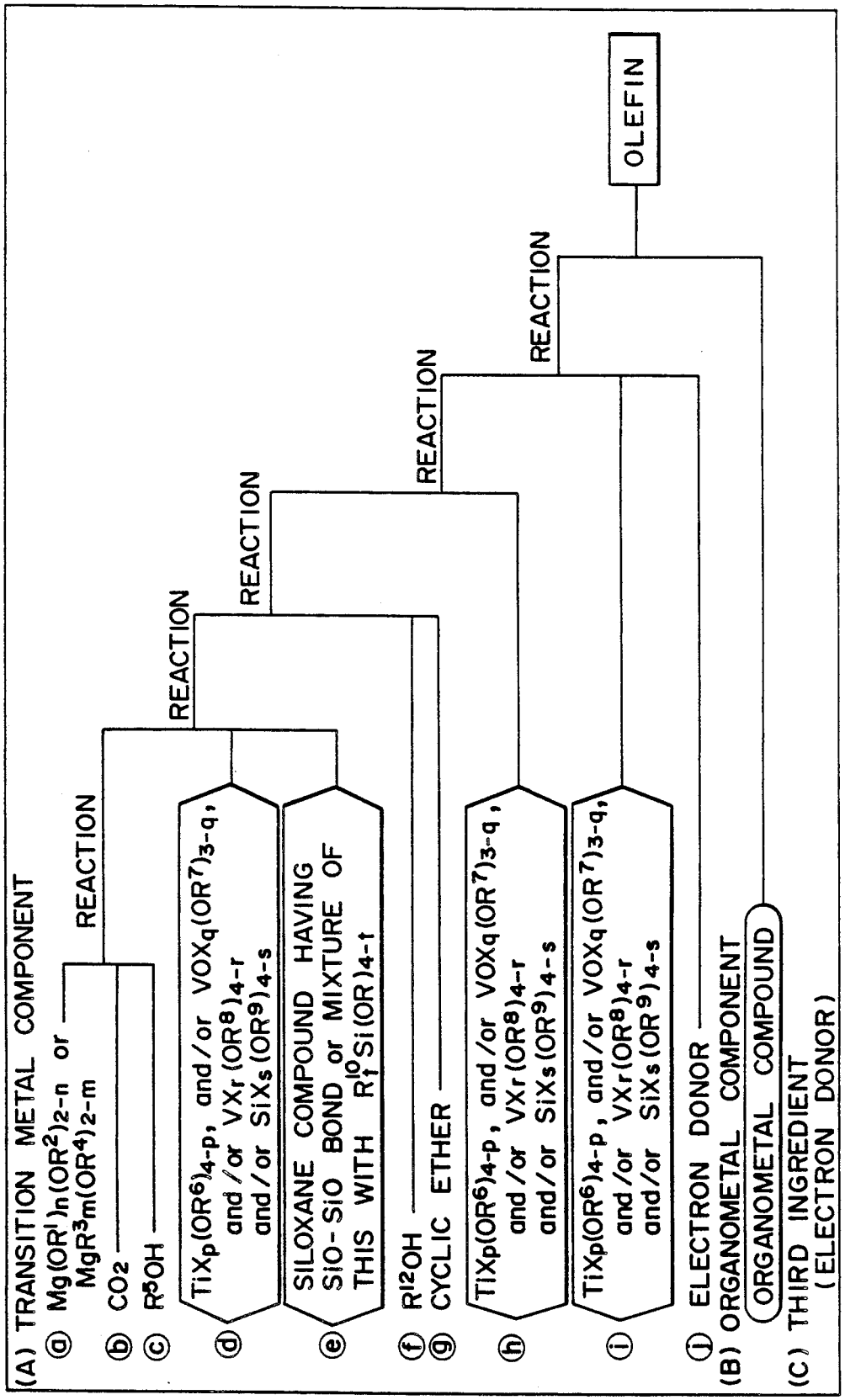

It will be noted that the reaction steps (A) through (D) described hereinabove are summarized in the FIG. 4 wherein the respective starting compounds are particularly shown.

The present invention is more particularly described by way of examples, which should not be construed as limiting the invention. Comparative examples are also shown.

EXAMPLE 1

Step A: Formation of Magnesium Carbonate Solution 230 g of magnesium ethoxide, 415 ml of 2-ethyl-1-hexanol and 1650 ml of toluene were charged into a 3 liter autoclave equipped with an agitator, a pressure gauge and a thermometer and substituted with highly pure nitrogen.

The mixture was heated at 90° C. for 3 hours in an atmosphere of carbon dioxide at 2 $kg/cm^2G$ while agitating at 500 r.p.m. The resultant solution was cooled and, after purging of the carbon dioxide gas, was handled under an atmospheric pressure. The solution contained 0.1 g/ml of magnesium ethoxide.

Step B: Formation of Solid Particles 300 ml of toluene, 19 ml of $TiCl_4$ and 20 ml of $B(OC_4H_9)_3$ were charged into a 1500 ml buffled (buffling rate of 0.15) flat bottom flask equipped with an agitator, a thermometer, a condenser and a nitrogen sealing line and mixed at room temperature for 5 minutes at 300 r.p.m., followed by charging 150 ml of the solution obtained in the step A in 10 minutes. Immediately after the charging, solid particles (I) precipitated.

Step C: Re-Precipitation of Solid Particles 50 ml of tetrahydrofuran (THF) was added to the precipitated solution by the use of a syringe. While agitating at 300 r.p.m., the content was heated to 60° C. within 15 minutes. The precipitated particles were dissolved in the THF solution and re-precipitation started within 15 minutes and formation of solid matter completed within 10 minutes. After the agitation continued at 60° C. for 45 minutes, the agitation was stopped to cause solid product (II) to be precipitated. The supernatant liquid was removed by decantation and the resultant solid product (II) was washed twice with 200 ml of toluene.

Step D: Treatment of Titanium (IV) Compound 200 ml of toluene and 100 ml of $TiCl_4$ were added to the solid product (II) obtained in the step C, followed by heating to 135° C. in 20 minutes while agitating at 600 r.p.m., and keeping the temperature for 1 hour. The agitation was stopped to precipitate solid product (III) and the supernatant liquid was removed by decantation.

100 ml of $TiCl_4$, 250 ml of toluene and 2.1 ml of diisobutyl phthalate were added to the solid product (III) and the mixture was agitated at 135° C. for 1.5 hours at 600 r.p.m. The supernatant liquid was removed by decantation.

200 ml of $TiCl_4$ was added and heated under reflux for 10 minutes while agitating at 600 r.p.m. the supernatant liquid was removed by decantation, followed by washing three times with 200 ml of toluene and four times with 200 ml of hexane.

17.4 g in total of solid product (IV) was collected. As analyzed, it contained 16.9% of magnesium, 2.4% of titanium, 55.1% of chlorine and 7.2% of di-n-butyl phthalate.

Size Distributions of the Carrier and Catalyst

Part of the toluene suspension of the solid product (II) obtained in step C and part of the hexane suspension of the solid product (IV) obtained after washing with hexane in step D were sampled and subjected to measurement of a size distribution by a laser diffraction technique. The results are shown in Table 1.

Vapor Phase Polymerization 2 mmols of triethylaluminum, 0.3 mmols of diphenyldimethoxysilane, 16.2 mg of the solid product (IV) and 0.8 liters of hydrogen were added to a stainless steel reactor which was substituted with nitrogen, had an inner capacity of 3 liters and was equipped with a multistage agitator, after which propylene was continuously fed and polymerized at 70° C. at a total pressure of 22 kg/cm$^2$G for 2 hours.

Thereafter, unreacted propylene was discharged to obtain 389 g of powdery polypropylene. Most of the polypropylene particles had a cubic or inclined hexagonal crystal form. The extracting rate after extraction of the polymer with boiling n-heptane for 6 hours was 1.2%, with a bulk density of 0.46 g/cm$^3$.

The size distribution of the polymer powder was 1.2% for >2000μ, 45.9% for 1000–2000μ, 27.7% for 710–1000μ, 9.5% for 500–710μ, 2.8% for 350–500μ, 0.1% for 250–350μ, 0% for 149–210%, and 0.1% for <149μ, with an average size particle being 1084μ.

EXAMPLE 2

The general procedure of Example 1 was repeated except that the solution in the step A of Example 1 was used in an amount of 114 ml, 100 ml of toluene, 100 ml of chlorobenzene and 15 ml of tri-n-butyl borate were used in step B, 60 ml of THF was used in the step C, and in the step D, 200 ml of TiCl$_4$ was used for the third treatment with TiCl$_4$ and the system was maintained at 135° C. for 1 hour, thereby obtaining 13.1 g of solid product (IV). The average particle size of the solid product (IV) was 35.2μ with particles having a size not larger than 5μ being contained in an amount of 5.0%.

EXAMPLE 3

The general procedure of Example 1 was repeated except that a one liter autoclave was used for the reactions of the step B and subsequent steps, 170 ml of the solution in the step A of Example 1 was used in the step B, 200 ml of toluene and 24 ml of tri-n-butoxy borane were used in the step B, that 70 ml of THF was used in the step C and the steps of from B to C were effected while agitating at 400 r.p.m. at a pressure of carbon dioxide controlled at 3 kg/cm$^2$G, and that for the second TiCl$_4$ treatment in the step D, 2.1 ml of diisobutyl phthalate was used instead of the di-n-butyl phthalate.

The yield of the solid product (IV) was 20.0 g and an average size of 31.8μ with particles having a size not larger than 5μ being 3.7%. The analytical values of the solid product were found to be 18.1% of Mg, 2.2% of Ti, 56.0% of Cl, and 8.4% of diisobutyl phthalate.

EXAMPLE 4

The general procedure of Example 1 was repeated except that 150 ml of the solution obtained in the step A of Example 1 was used in the step B along with 100 ml of toluene, 100 ml of chlorobenzene and 24 ml of triisopropyl borate, and that in the step C, 60 ml of THF was used. The resultant solid product (IV) had an average size of 27.2μ and particles having a size of not larger 5μ were 3.1% in amount.

EXAMPLE 5

The general procedure of Example 1 was repeated except that 114 ml of the solution obtained in the step A of Example 1 was used along with 60 ml of iso-paraffin (Isober G) and 14 ml of TiCl$_4$, that 27 ml of THF was used in the step C and that the TiCl$_4$ treatment in the step D was effected in two stages and the third washing with TiCl$_4$ was not effected.

EXAMPLE 6

The general procedure of Example 1 was repeated except that 286 g of magnesium propoxide was used in the step A in place of magnesium ethoxide along with 383 g of 2-ethyl-1-hexanol was used.

EXAMPLE 7

One liter of toluene, 100 ml of tri-n-butyl borate and 100 ml of TiCl$_4$ were charged into a 5 liter stainless steel reactor which was equipped with an agitator, a thermometer, a condenser, a nitrogen sealing line and a starting material feed line and which had a heating jacket and four flat buffles in the inside of the reactor (buffling rate of 0.15) and agitated at room temperature at 120 r.p.m. for 5 minutes, followed by charging 750 ml of the solution obtained in the step A of Example 1 in 30 minutes (step B). 250 ml of THF was further charged and agitated at an elevated agitation rate of 180 r.p.m., followed by heating up to 60° C. in 15 minutes and keeping at that temperature for 45 minutes (step C).

The slurry after the reaction was transferred under nitrogen sealing conditions to a 5 liter filter equipped with an agitator, a condenser, a thermometer and a nitrogen sealing line and having a heating jacket and a filter unit at the bottom thereof, and subjected to filtration, followed by washing twice with 500 ml of toluene.

500 ml of TiCl$_4$ and 500 ml of toluene were added to the solid product (II) in the filter and maintained at 135° C. for 1 hour at 180 r.p.m. This was filtered, to which 500 ml of TiCl$_4$, 10.5 ml of di-n-butyl phthalate and 1000 ml of toluene were added, followed by keeping at 135° C. at 180 r.p.m. for 1.5 hours and filtration (step D).

1000 ml of TiCl$_4$ was further added to the resultant solid product (IV) and heated under reflux for 10 minutes, followed by filtration and washing three times with 500 ml of toluene and four times with 500 ml of hexane. The solid product (IV) left in the filter was dried in a stream of hot nitrogen at approximately 60° C. to obtain 81.6 g of a catalyst.

The analysis of the solid product (IV) revealed 18.6% of Mg, 2.1% of Ti, and 6.6% of di-n-butyl phthalate. The average particle size of the solid product (IV) was 42.1μ and the content of the particles having a size not larger than 5μ was 2.2%.

COMPARATIVE EXAMPLE 1

The general procedure of Example 1 was repeated except that in the step B, the boron compound was not used, thereby obtaining 14.3 g of solid product (IV). In this case, a long time was required for precipitation by decantation from the step C to the step D, thus part of fine particles being lost. As shown in Table 1, fine powder was contained in very large amounts in the solid product (IV).

COMPARATIVE EXAMPLE 2

The general procedure of Example 1 was repeated except that 20 ml of tetraethoxysilane was used instead of the boron compound in the step B, thereby obtaining 17.1 g of solid product (IV). The size distribution of the resultant solid product is shown in Table 1.

COMPARATIVE EXAMPLE 3

The general procedure of Example 4 was repeated except that in the step B of Example 4, 20 ml of trimethylchlorosilane was used instead of the boron compound.

Evaluation on the Vapor Phase Polymerization

The solid products (IV) obtained in Examples 2 to 7 and Comparative Examples 1 to 3 were used for carrying out the vapor phase polymerization in the same manner as in Example 1. The results are shown in Table 2.

EXAMPLE 8

The general procedure of Example 1 was repeated except that 2 ml of tri-n-borane was used along with 18 ml of tri-n-butyl borate was used, thereby obtaining 17.3 g of solid product (IV). The solid product had an average particle size of $33\mu$ and the content of the particles having a size not larger than $5\mu$ was 5.1%.

EXAMPLE 9

The general procedure of Example 1 was repeated except that 60 ml of tetrahydropyran was used instead of 50 ml of THF in the step C of Example 1, thereby obtaining 17.3 g of solid product (IV). The solid product had an average particle size of $25.1\mu$ and the content of the particles having a size not larger than $5\mu$ was 7.2%.

EXAMPLE 10

The general procedure of Example 1 was repeated except that 24 ml of isobutyl borate was used instead of 20 ml of n-butyl borate and 60 ml of 2-methyltetrahydrofuran was used instead of 50 ml of THF in the step C of Example 1, thereby obtaining 17.5 g of solid product (IV). The solid product had an average particle size of $28.4\mu$ and the content of the particles having a size not larger than $5\mu$ was 5.9%.

COMPARATIVE EXAMPLE 4

The general procedure of Example 9 was repeated except that 20 ml of tetraethoxysilane was used instead of the boron compound, thereby obtaining 16.3 g of solid product (IV). The solid product contained a large amount of fine powder and the content of the particles having a size not larger than $5\mu$ was >25%.

COMPARATIVE EXAMPLE 5

The general procedure of Example 10 was repeated except that 20 ml of trimethylethoxysilane was used instead of the boron compound in the step B of Example 10, thereby obtaining 16.4 g of solid product (IV). The solid product had an average particle size of $16.4\mu$ and the content of the particles having a size not larger than $5\mu$ was 13%.

Evaluation on Slurry Polymerization

The catalysts (solid products (IV)) obtained in Examples 8 to 10 and Comparative Examples 4 to 5 were used for carrying out hexane slurry polymerization of propylene.

1000 ml of hexane was charged into a 1.5 liter autoclave, to which 2 mmols of TEA, 0.2 mmols of diphenyldimethoxysilane and from 15 mg to 17 mg of each catalyst were added, followed by introduction of 60 ml of hydrogen, keeping the pressure at 7 kg/cm$^2$G by the addition of propylene and polymerization propylene at 70° C. for 2 hours. After completion of the polymerization reaction, the monomer gas was purged and 50 g of methanol was added to the reaction system, which was subsequently agitated at 70° C. for 10 minutes and subjected to filtration. The resultant polymer was dried and the yield of the polymer based on the amount of the catalyst used was calculated. The polymer dissolved in the hexane was collected from the filtrate. The results are shown in Table 3.

EXAMPLE 11

The catalyst obtained in Example 2 was used to carry out bulk polymerization.

2 mmols of TEA, 0.3 mmols of phenyltriethoxysilane, 10 mg of the catalyst and 300 ml of hydrogen were charged into a 1 liter bulk polymerization vessel along with 500 g of propylene, followed by polymerization at 70° C. under a pressure of 35 kg/cm$^2$ for 30 minutes. Unreacted propylene monomer was purged to obtain 170 g of a dry powder. The yield of the polymer per g of the catalyst was 17,000 g and the extracting rate after extraction with n-heptane reflux for 6 hours was 1.2% with an apparent bulk density of the polymer of 0.50 g/cm$^3$.

EXAMPLE 12

10 mg of the catalyst obtained in Example 7 was used to carry out the bulk polymerization for 20 minutes in the same manner as in Example 11, after which unreacted propylene was purged and a mixed gas of propylene/ethylene=2/1 and 150 ml of hydrogen gas were fed for vapor phase polymerization at 70° C. at 18 kg/cm$^2$G for 30 minutes. The yield of the polymer was 180 g and the content of ethylene in the polymer was 10.3%.

EXAMPLE 13

16.5 mg of the catalyst obtained in Example 7, 2 mmols of TEA, 0.2 mmols of diphenyldimethoxysilane and 150 ml of hydrogen were charged into a polymerization vessel as used in Example 1 along with propylene monomer, followed by feeding a mixed gas of propylene/ethylene=4/1 for copolymerization at 70° C. at 22 kg/cm$^2$G for 1 hour. The yield of the polymer was 190 g and the content of the ethylene in the polymer was 50%.

TABLE 1

| Example, etc. No. | Solid Product (II) (IV) by Vapor phase polymerization | | | | | |
|---|---|---|---|---|---|---|
| | Example 1 | | Comp. example 1 | | Comp. example 2 | |
| Solid Product Diameter | (II) % | (IV) % | (II) % | (IV) % | (II) % | (IV) % |
| 0.9$\mu$ | 0.0 | 0.0 | 5.1 | 12.8 | 0.7 | 0.9 |
| 1.4$\mu$ | 0.0 | 0.0 | 6.5 | 11.8 | 0.9 | 1.5 |
| 1.9$\mu$ | 0.4 | 0.5 | 10.1 | 16.2 | 2.2 | 4.3 |

TABLE 1-continued

| | Solid Product (II) (IV) by Vapor phase polymerization | | | | | |
|---|---|---|---|---|---|---|
| Example, etc. No. | Example 1 | | Comp. example 1 | | Comp. example 2 | |
| Solid Product Diameter | (II) % | (IV) % | (II) % | (IV) % | (II) % | (IV) % |
| 2.8μ | 1.1 | 2.5 | 9.6 | 9.9 | 1.2 | 1.4 |
| 3.9μ | 0.5 | 1.3 | 5.8 | 5.6 | 0.8 | 0.7 |
| 5.5μ | 0.6 | 0.6 | 2.5 | 4.1 | 0.7 | 0.8 |
| 7.8μ | 1.2 | 1.1 | 3.1 | 5.4 | 2.3 | 3.0 |
| 11.0μ | 2.1 | 1.7 | 6.6 | 9.0 | 7.1 | 8.5 |
| 16.0μ | 3.0 | 5.7 | 9.7 | 11.4 | 10.9 | 14.4 |
| 22.0μ | 9.6 | 13.5 | 20.5 | 10.7 | 21.1 | 25.6 |
| 31.0μ | 27.6 | 30.1 | 16.4 | 3.1 | 33.5 | 29.7 |
| 44.0μ | 35.9 | 31.5 | 4.2 | 0.0 | 15.2 | 9.2 |
| 62.0μ | 15.6 | 10.5 | 0.3 | 0.0 | 3.4 | 0.0 |
| 88.0μ | 2.4 | 1.0 | 0.0 | 0.0 | 0.0 | 0.0 |
| Average diameter (μ) | 33.4 | 29.0 | 12.8 | 6.7 | 22.6 | 19.3 |

TABLE 2

| | Result of Vapor phase Polymerization | | | |
|---|---|---|---|---|
| Example Comp. example No. | Polymer yield (g) | Catalyst activity (g-pp/g-Cat.) | $C_6$ Extruction rate (%) | Polymer apparent Bulk density (g/cm$^3$) |
| Example | | | | |
| 1 | 389 | 24000 | 1.2 | 0.46 |
| 2 | 326 | 21000 | 1.1 | 0.48 |
| 3 | 371 | 24700 | 1.7 | 0.48 |
| 4 | 359 | 22000 | 1.4 | 0.45 |
| 5 | 213 | 13500 | 3.5 | 0.42 |
| 6 | 329 | 19800 | 1.5 | 0.45 |
| 7 | 363 | 23700 | 1.1 | 0.47 |
| Comp. example | | | | |
| 1 | 286 | 17000 | 2.4 | 0.41 |
| 2 | 392 | 24500 | 1.2 | 0.47 |
| 3 | 269 | 16300 | 3.1 | 0.42 |

TABLE 3

| | Result of Slurry Polymerization | | | | |
|---|---|---|---|---|---|
| Example Comp. example No. | Polymer yield (g) | Catalyst activity (g-pp/ g-Cat.) | $C_8$ Dissolution material | $C_8$ Extruction residue rate | Polymer apparent Bulk density (g/cm$^3$) |
| Example | | | | | |
| 8 | 126 | 7400 | 0.35 | 0.51 | 0.41 |
| 9 | 161 | 10400 | 2.8 | 5.23 | 0.44 |
| 10 | 210 | 13100 | 0.36 | 0.59 | 0.47 |
| Comp. example | | | | | |
| 4 | 82 | 5100 | 0.31 | 0.65 | 0.36 |
| 5 | 183 | 10500 | 3.30 | 6.08 | 0.38 |

The present invention of the second aspect is more particularly described by way of examples.

EXAMPLE 14

Step A: Formation of Magnesium Carbonate Solution 230 g of magnesium ethoxide, 415 ml of 2-ethyl-1-hexanol and 1650 ml of toluene were charged into a 3 liter autoclave equipped with an agitator, a pressure gauge and a thermometer and substituted with highly pure nitrogen.

The mixture was heated at 90° C. for 3 hours in an atmosphere of carbon dioxide at 3 kg/cm$^2$G while agitating at 500 r.p.m. The resultant solution was cooled and, after purging of the carbon dioxide gas, was handled under an atmospheric pressure. The solution contained 0.1 g/ml of magnesium ethoxide.

Step B: Formation of Solid Particles 300 ml of toluene, 19 ml of TiCl$_4$ and 15 ml of trimethylethoxysilane were charged into a 1500 ml buffled (buffling rate of 0.15) flat bottom flask equipped with an agitator, a thermometer, a condenser and a nitrogen sealing line and mixed at room temperature for 5 minutes at 300 r.p.m., followed by charging 150 ml of the solution obtained in the step A in 10 minutes. Immediately after the charging, solid particles (I) precipitated.

Step C: Re-precipitation of Solid Particles 3 ml of ethanol and 50 ml of tetrahydrofuran (THF) were successively added to the precipitated solution by the use of separate syringes. While agitating at 300 r.p.m., the content was heated to 60° C. within 15 minutes. The precipitated particles were dissolved in the THF solution and re-precipitation started within 15 minutes and formation of solid matter completed within 10 minutes. After the agitation continued at 60° C. for 45 minutes, it was stopped to cause solid product (II) to be precipitated. The supernatant liquid was removed by decantation and the resultant solid product (II) was washed twice with 200 ml of toluene.

Step D: Treatment of Titanium (IV) Compound 200 ml of toluene and 100 ml of TiCl$_4$ were added to the solid product (II) obtained in the step C, followed by heating to 135° C. in 20 minutes while agitating at 600 r.p.m., and keeping the temperature for 1 hour. The agitation was stopped to precipitate solid product (III) and the supernatant liquid was removed by decantation.

100 ml of TiCl$_4$, 250 ml of toluene and 2.1 ml of diisobutyl phthalate were added to the solid product (III) and the mixture was agitated at 135° C. for 1.5 hours at 600 r.p.m. The supernatant liquid was removed by decantation.

200 ml of TiCl$_4$ was added and heated under reflux for 10 minutes while agitating at 600 r.p.m. The supernatant liquid was removed by decantation, followed by washing three times with 200 ml of toluene and four times with 200 ml of hexane.

9.7 g in total of solid product (IV) was collected. The solid product (IV) was found to contain 18.4% of magnesium, 2.2% of titanium, 58.6% of chlorine and 11.6% of di-n-butyl phthalate. The average size of the solid product (IV) was 42.6μ with particles having a size of not larger than 5μ being 0.3%.

Vapor Phase Polymerization 2 mmols of triethylaluminum, 0.3 mmols of diphenyldimethoxysilane, 16.0 mg of the solid product (IV) and 0.8 liters of hydrogen were added to stainless steel reactor which was substituted with nitrogen, had an inner capacity of 3 liters and was equipped with a multistage agitator, after which propylene was continuously fed and polymerized at 70° C. at a total pressure of 22 kg/cm$^2$G for 2 hours. Thereafter, unreacted propylene was discharged to obtain 384 g of powdery polypropylene. The polymerization activity per gram of the catalyst was 23100 g of polypropylene per g of the catalyst. Most of the polypropylene particles had a cubic or inclined hexagonal crystal form. The remaining rate after extraction of the polymer with boiling n-heptane for 6 hours was 98.8%, with an MFR value of 4.1 and an apparent bulk density of 0.48 g/cm$^3$.

The size distribution of the polymer powder is shown in Table 5.

EXAMPLE 15

The general procedure of Example 14 was repeated except that 150 ml of the solution in the step A of Example 14 was used, a mixture of 100 ml of toluene, 100 ml of chlorobenzene and 17 ml of diethyldiethoxysilane was used in the step B, and 40 ml of THF was used along with 4 ml of isopropanol in the step C, and in the step D, the solid products (II) and (III) were, respectively, treated at 105° C. wherein for the third treatment with $TiCl_4$, 200 ml of $TiCl_4$ was used as the solvent and was maintained at 105° C. for 1 hour, thereby obtaining 9.1 g of solid product (IV). The average particle size of the solid product (IV) was $40.5\mu$ with particles having a size not larger than $5\mu$ being contained in an amount of 0.2%.

EXAMPLE 16

The general procedure of Example 14 was repeated except that 114 ml of the solution in the step A of Example 14 was used, 22 ml of methyltriethoxysilane was used as the silane compound in the step B, and a mixture of 50 ml of THF and 2.5 ml of isobutanol was added in the step C, thereby obtaining 8.5 g of solid product (IV) having an average particle size of $43.1\mu$. The content of particles having a size not larger than $5\mu$ was 0.5%.

EXAMPLE 17

The general procedure of Example 15 was repeated except that a mixture of 14 ml of dimethyldiethoxysilane and 2 ml of allyltolmethoxysilane was used as the silane compound in the step B, that 6 ml of t-butanol was used along with 40 ml of THF in the step C, that the temperature prior to heating during the course of from the step B to the step C was kept at a temperature $-5°$ to $0°$ C. and the temperature rise in the step C was gradual at $1°$ C./minute, and that for the dilution of $TiCl_4$ in the step D, 100 ml of 1,2-dichloroethane was used instead of 200 to 250 ml of toluene and 2.1 ml of di-n-butyl phthalate was used instead of diisobutyl phthalate. The resultant solid product (IV) had an average particle size of $44.7\mu$ and the content of the particles having a size not larger than $5\mu$ was 0.4%.

EXAMPLE 18

The general procedure of Example 14 was repeated except that 170 ml of the solution in the step A of Example 14 was used and 240 ml of toluene, 60 ml of isoparaffin (Isoper G) and 24 ml of $TiCl_4$ were used, that 10 ml of cyclohexanol was used along with 27 ml of THF in the step C, and that the treatment with $TiCl_4$ in the step D was in two stages with the third washing with $TiCl_4$ being not carried out. The resultant solid product (IV) was obtained in an amount of 11.8 g. It had an average particle size of $37.2\mu$ and the content of the particles having a size not larger than $5\mu$ was 0.5%.

EXAMPLE 19

The general procedure of Example 14 was repeated except that 286 g of magnesium propoxide was used in the step A in place of magnesium ethoxide, to which 457 ml of 2-ethyl-1-hexanol and 1550 ml of toluene were added and the mixture was kept at 40° C. for 8 hours while agitating at 500 r.p.m. in an atmosphere of carbon dioxide at 1 kg/cm²G to make a uniform solution, after which the carbon dioxide gas was purged and the uniform solution was used as an Mg solution and that in the step C, 12 ml of 2-ethyl-1-hexanol was used instead of ethanol, thereby obtaining 7.8 g of solid product (IV). The resultant solid product (IV) had an average particle size of $44.3\mu$ and the content of the particles having a size not larger than $5\mu$ was 0.2%.

EXAMPLE 20

One liter of toluene, 75 ml of trimethylmonoethoxysilane and 100 ml of $TiCl_4$ were charged into a 5 liter stainless steel reactor which was equipped with an agitator, a thermometer, a condenser, a nitrogen sealing line and a starting material feed line and which had a heating jacket and four flat buffles in the inside of the reactor (buffling rate of 0.15) and agitated at room temperature at 120 r.p.m. for 5 minutes, followed by charging 750 ml of the solution obtained in the step A of Example 14 in 30 minutes. 250 ml of THF and 20 ml of isopropanol were further charged into the mixture and agitated at an elevated agitation rate of 180 r.p.m., followed by heating up to 60° C. in 15 minutes and keeping at that temperature for 45 minutes.

The slurry after the reaction was transferred under nitrogen sealing conditions to a 5 liter filter equipped with an agitator, a condenser, a thermometer and a nitrogen sealing line and having a heating jacket and a filter unit at the bottom thereof, and subjected to filtration, followed by washing twice with 500 ml of toluene.

500 ml of $TiCl_4$ and 500 ml of toluene were added to the solid product (II) in the filter and maintained at 135° C. for 1 hour at 180 r.p.m. This was filtered, to which 500 ml of $TiCl_4$, 10.5 ml of di-n-butyl phthalate and 1000 ml of toluene were added, followed by keeping at 135° C. at 180 r.p.m. for 1.5 hours and filtration.

1000 ml of $TiCl_4$ was further added to the resultant solid product (IV) and heated under reflux for 10 minutes, followed by filtration and washing three times with 500 ml of toluene and four times with 500 ml of hexane. The solid product (IV) left in the filter was dried in a stream of hot nitrogen at approximately 60° C. to obtain 53.2 g of a catalyst.

The analysis of the solid product (IV) revealed 18.0% of Mg, 2.3% of Ti, 57.5% of Cl and 10.7% of di-n-butyl phthalate. The average particle size of the solid product (IV) was $43.6\mu$ and the content of the particles having a size not larger than $5\mu$ was 0.2%.

COMPARATIVE EXAMPLE 6

The general procedure of Example 14 was repeated except that in the step C, ethanol was not used, thereby obtaining 14.3 g of solid product (IV). The average size of the solid product (IV) was $18.5\mu$ and the content of the particles having a size not larger than $5\mu$ was 2.3%.

COMPARATIVE EXAMPLE 7

The general procedure of Example 14 was repeated except that any silane compound was not used in the step B of Example 14 and any alcohol was used in the step C, thereby obtaining 13.8 g of solid product (IV). The average size of the solid product was $6.7\mu$ and the content of the particles having $5\mu$ was 41.2%.

Evaluation on the Vapor Phase Polymerization

The solid products (IV) obtained in Examples 15 to 20 and Comparative Examples 6 and 7 were used for carrying out the vapor phase polymerization in the same manner as in Example 14. The results are shown in Table 4. The size distribution of polymers obtained in

EXAMPLE 21

The general procedure of Example 14 was repeated except that 15 ml of TiCl$_4$ and 5 ml of SiCl$_4$ were used as a precipitating agent in the step B of Example 14 and a mixed alcohol of 2 ml of isopropanol and 2 ml of ethanol was used, thereby obtaining 10.6 g of solid product (IV). The solid product had an average particle size of 37.5$\mu$ and the content of the particles having a size not larger than 5$\mu$ was 0.6%.

EXAMPLE 22

The general procedure of Example 14 was repeated except that 60 ml of tetrahydropyran was used instead of 50 ml of THF in the step C of Example 14, thereby obtaining 10.0 g of solid product (IV). The solid product (IV) had an average particle size of 33.7$\mu$ and the content of the particles having a size not larger than 5$\mu$ was 0.9%.

EXAMPLE 23

The general procedure of Example 14 was repeated except that 20 ml of n-butanol was used in the step C of Example 14 and 60 ml of 2-methyltetrahydrofuran was used instead of 50 ml of THF, thereby obtaining 12.5 g of solid product (IV). The solid product (IV) had an average particle size of 31.8$\mu$ and the content of the particles having a size not larger than 5$\mu$ was 1.4%.

COMPARATIVE EXAMPLE 8

The general procedure of Example 22 was repeated except that there was not used the alcohol in the step C of Example 22, thereby obtaining 15.2 g of solid product (IV). The solid product (IV) had an average particle size of 12.5$\mu$ and the content of the particles having a size not larger than 5$\mu$ was 28.3%.

COMPARATIVE EXAMPLE 9

The general procedure of Example 23 was repeated except that there was not used the alcohol in the step B of Example 23, thereby obtaining 16.7 g of solid product (IV). The solid product (IV) had an average particle size of 14.9$\mu$ and the content of the particles having a size not larger than 5$\mu$ was 17.1%.

Evaluation on Slurry Polymerization

The catalysts (solid products (IV)) obtained in Examples 21 to 23 and Comparative Examples 8 to 9 were used for carrying out hexane slurry polymerization of propylene.

1000 ml of hexane was charged into a 1.5 liter autoclave, to which 2 mmols of TEA, 0.2 mmols of diphenyldimethoxysilane and from 15 mg to 17 mg of each catalyst were added, followed by introduction of 60 ml of hydrogen, keeping the pressure at 7 kg/cm$^2$G by the addition of propylene and polymerizing propylene at 70° C. for 2 hours. After completion of the polymerization reaction, the monomer gas was purged and 50 g of methanol was added to the reaction system, which was subsequently agitated at 70° C. for 10 minutes and subjected to filtration. The resultant polymer was dried and the yield of the polymer based on the amount of the catalyst used was calculated. The polymer dissolved in the hexane was collected from the filtrate. The results are shown in Table 6.

EXAMPLE 24

The catalyst obtained in Example 15 was used to carry out bulk polymerization.

2 mmols of TEA, 0.3 mmols of phenyltriethoxysilane, 10 mg of the catalyst and 300 ml of hydrogen were charged into a 1 liter bulk polymerization vessel along with 500 g of propylene, followed by polymerization at 70° C. under a pressure of 35 kg/cm$^2$G for 30 minutes. Unreacted propylene monomer was purged to obtain 270 g of a dry powder. The yield of the polymer per g of the catalyst was 27,000 g and the remaining rate after extraction with n-heptane reflux for 6 hours was 98.3% with an MFR value of 8.3 and an apparent bulk density of the polymer of 0.50 g/cm$^3$.

EXAMPLE 25

10 mg of the catalyst obtained in Example 20 was used to carry out the bulk polymerization for 20 minutes in the same manner as in Example 24, after which unreacted propylene was purged and a mixed gas of propylene/ethylene=2/1 and 150 ml of hydrogen gas were fed for vapor phase polymerization at 70° C. at 18 kg/cm$^2$G for 30 minutes. The yield of the polymer was 210 g with a T-MFR value of 1.8, and the content of ethylene in the polymer was 11.6%.

EXAMPLE 26

16.5 mg of the catalyst obtained in Example 20, 2 mmols of TEA, 0.2 mmols of diphenyldimethoxysilane and 150 ml of hydrogen were charged into a polymerization vessel as used in Example 14 along with propylene monomer, followed by feeding a mixed gas of propylene/ethylene=4/1 for copolymerization at 70° C. at 22 kg/cm$^2$G for 1 hour. The yield of the polymer was 207 g and the content of the ethylene in the polymer was 48%.

TABLE 4

| Example Comp. example No. | Catalyst activity (g-PP/g-Cat.) | C$_7$ Extruction residue rate (%) | MFR (g/10 min) | Polymer apparent Bulk density (g/cm$^3$) |
|---|---|---|---|---|
| Example | | | | |
| 15 | 22600 | 90.0 | 4.1 | 0.47 |
| 16 | 20300 | 98.6 | 5.0 | 0.47 |
| 17 | 24100 | 97.3 | 2.9 | 0.45 |
| 18 | 21100 | 98.2 | 3.3 | 0.43 |
| 19 | 23900 | 98.7 | 3.7 | 0.47 |
| 20 | 23400 | 98.8 | 3.2 | 0.49 |
| Comp. example | | | | |
| 6 | 21700 | 98.4 | 4.2 | 0.45 |
| 7 | 16800 | 97.6 | 5.3 | 0.39 |

TABLE 5

Polymer Particle size distribution obtained by Vapor phase polymerization

| | Example 14 (%) | Comp. example 6 (%) | Comp. example 7 (%) |
|---|---|---|---|
| Powder diameter | | | |
| 2000$\mu$< | 4.2 | 0.0 | 0.0 |
| 1400–2000$\mu$ | 30.5 | 0.3 | 0.0 |
| 1000–1400$\mu$ | 53.4 | 8.7 | 3.5 |
| 710–1000$\mu$ | 8.2 | 37.4 | 11.9 |
| 500–710$\mu$ | 2.9 | 36.5 | 13.8 |
| 355–500$\mu$ | 0.4 | 11.7 | 9.4 |
| 250–355$\mu$ | 0.3 | 3.0 | 6.7 |
| 180–250$\mu$ | 0.1 | 0.7 | 14.4 |

TABLE 5-continued

| Polymer Particle size distribution obtained by Vapor phase polymerization | | | |
|---|---|---|---|
| | Example 14 (%) | Comp. example 6 (%) | Comp. example 7 (%) |
| 106–180μ | 0 | 1.0 | 15.2 |
| <106μ | 0 | 0.7 | 25.1 |
| Average diameter (μ) | 1450μ | 686μ | 225μ |

TABLE 6

| | Results of Slurry Polymerization | | | | |
|---|---|---|---|---|---|
| Example Comp. example No. | Catalyst activity (g-PP/g-Cat.) | $nC_6$ Dissolutive material (%) | $nC_7$ Extruction residue rate (%) | MFR (g/10 min) | Polymer apparent Bulk density (g/cm$^3$) |
| Example | | | | | |
| 21 | 8900 | 0.33 | 99.33 | 3.2 | 0.49 |
| 22 | 8200 | 0.39 | 99.25 | 3.6 | 0.46 |
| 23 | 11500 | 0.77 | 96.79 | 3.4 | 0.45 |
| Comp. example | | | | | |
| 8 | 7900 | 0.34 | 99.08 | 4.3 | 0.41 |
| 9 | 9400 | 1.85 | 95.17 | 10.2 | 0.43 |

The present invention is more particularly described by way of examples.

EXAMPLE 27

Step A: Formation of Magnesium Carbonate Solution 230 g of magnesium ethoxide, 415 ml of 2-ethyl-1-hexanol and 1650 ml of toluene were charged into a 3 liter autoclave equipped with an agitator, a pressure gauge and a thermometer and substituted with highly pure nitrogen.

The mixture was heated at 90° C. for 3 hours in an atmosphere of carbon dioxide at 3 kg/cm$^2$G while agitating at 500 r.p.m. The resultant solution was cooled and, after purging of the carbon dioxide gas, was handled under an atmospheric pressure. The solution contained 0.1 g/ml of magnesium ethoxide.

Step B: Formation of Solid Particles 300 ml of toluene, 19 ml of TiCl$_4$ and 15 ml of B(OC$_4$H$_9$)$_3$ were charged into a buffled (buffling rate of 0.15) flat bottom flask equipped with an agitator, a thermometer, a condenser and a nitrogen sealing line and mixed at room temperature for 5 minutes at 300 r.p.m., followed by charging 150 ml of the solution obtained in the step A in 10 minutes. Immediately after the charging, solid particles (I) precipitated.

Step C: Re-precipitation of Solid Particles 4 ml of ethanol and 50 ml of tetrahydrofuran (THF) were successively added to the precipitated solution by the use of separate syringes. While agitating at 300 r.p.m., the content was heated to 60° C. within 15 minutes. The precipitated particles were dissolved in the THF solution and re-precipitation started within 15 minutes and formation of solid matter completed within 10 minutes. After the agitation continued at 60° C. for 45 minutes, the agitation was stopped to cause solid product (II) to be precipitated. The supernatant liquid was removed by decantation and the resultant solid product (II) was washed twice with 200 ml of toluene.

Step D: Treatment of Titanium (IV) Compound 200 ml of toluene and 100 ml of TiCl$_4$ were added to the solid product (II) obtained in the step C, followed by heating to 135° C. in 20 minutes while agitating at 600 r.p.m., and keeping the temperature for 1 hour. The agitation was stopped to precipitate solid product (III) and the supernatant liquid was removed by decantation.

100 ml of TiCl$_4$, 250 ml of toluene and 2.1 ml of diisobutyl phthalate were added to the solid product (III) and the mixture was agitated at 135° C. for 1.5 hours at 600 r.p.m. The supernatant liquid was removed by decantation.

200 ml of TiCl$_4$ was added and heated under reflux for 10 minutes while agitating at 600 r.p.m. The supernatant liquid was removed by decantation, followed by washing three times with 200 ml of toluene and four times with 200 ml of hexane.

8.5 g in total of solid product (IV) was collected. The average particle size of the solid product (IV) was 45μ with the content of particles having a size not larger than 5μ being 0.1%. As analyzed, it contained 17.1% of magnesium, 2.4% of titanium, 55.3% of chlorine and 6.8% of di-n-butyl phthalate.

Vapor Phase Polymerization 2 mmols of triethylaluminum, 0.3 mmols of diphenyl-dimethoxysilane, 16.0 mg of the solid product (IV) and 0.8 liters of hydrogen were added to stainless steel reactor which was substituted with nitrogen, had an inner capacity of 3 liters and was equipped with a multistage agitator, after which propylene was continuously fed and polymerized at 70° C. at a total pressure of 22 kg/cm$^2$G for 2 hours. Thereafter, unreacted propylene was discharged to obtain 384 g of powdery polypropylene. Most of the polypropylene particles had a cubic or inclined hexagonal crystal form. The remaining rate after extraction of the polymer with boiling n-heptane for 6 hours was 98.8%, with an MFR value of 3.9 and an apparent bulk density of 0.47 g/cm$^3$.

The size distribution of the polymer powder is shown in Table 8.

EXAMPLE 28

The general procedure of Example 27 was repeated except that the solution in the step A of Example 27 was used in an amount of 150 ml, the hydrocarbon solvent used in the step B was a mixture of 100 ml of toluene and 100 ml of chlorobenzene, 3 ml of ethanol was used along with 40 ml of THF in the step C instead of the isopropanol, and in the step D, the solid products (II) and (III) were, respectively, treated at 105° C. wherein for the third treatment with TiCl$_4$, TiCl$_4$ was used as the solvent and was maintained at 105° C. for 1 hour, thereby obtaining 9.3 g of solid product (IV). The average particle size of the solid product (IV) was 40.2μ with particles having a size not larger than 5μ being contained in an amount of 0.2%.

EXAMPLE 29

The general procedure of Example 27 was repeated except that 114 ml of the solution in the step A of Example 27 was used, 24 ml of tributoxy borane was used in the step B, and a mixture of 50 ml of THF and 4 ml of isobutanol was added in the step C in 1 hour, thereby obtaining 8.2 g of solid product (IV) having an average particle size of 42.3μ. The content of particles having a size not larger than 5μ was 0.5%.

EXAMPLE 30

The general procedure of Example 28 was repeated except that 7 ml of cyclohexanol was used in the step C of Example 28 along with 40 ml of THF, the temperature prior to heating during the course of from the step B to the step C was kept at a temperature −5° to 0° C., the temperature rise in the step C was gradual at 1° C./minute, and for the dilution of $TiCl_4$ in the step D, 100 ml of 1,2-dichloroethane was used instead of 200 to 250 ml of toluene and 2.1 ml of di-n-butyl phthalate was used instead of diisobutyl phthalate. The resultant solid product (IV) had an average particle size of 38.4μ and the content of the particles having a size not larger than 5μ was 0.3%.

EXAMPLE 31

The general procedure of Example 27 was repeated except that 170 ml of the solution in the step A of Example 27 was used, 140 ml of toluene, 60 ml of iso-paraffin (Isober G) and 24 ml of $TiCl_4$ were used, 10 ml of isopropanol was used along with 27 ml of THF in the step C, and the treatment with $TiCl_4$ in the step D was in two stages with the third washing with $TiCl_4$ being not carried out. The resultant solid product (IV) had an average particle size of 35.1μ and the content of the particles having a size not larger than 5μ was 0.8%.

EXAMPLE 32

The general procedure of Example 27 was repeated except that 286 g of magnesium propoxide was used in the step A in place of magnesium ethoxide, to which 457 ml of 2-ethyl-1-hexanol and 1550 ml of toluene were added and the mixture was kept at 40° C. for 8 hours while agitating at 500 r.p.m. in an atmosphere of carbon dioxide at 1 kg/cm²G to make a uniform solution, after which the carbon dioxide gas was purged and the uniform solution was used as an Mg solution and that in the step C, 12 ml of 2-ethyl-1-hexanol was used instead of isopropanol. The resultant solid product had an average particle size of 40.7μ and the content of the particles having a size not larger than 5μ was 0.4%.

EXAMPLE 33

One liter of toluene, 100 ml of tri-n-butyl borate and 100 ml of $TiCl_4$ were charged into a 5 liter stainless steel reactor which was equipped with an agitator, a thermometer, a condenser, a nitrogen sealing line and a starting material feed line and which had a heating jacket and four flat buffles in the inside of the reactor (buffling rate of 0.15) and agitated at room temperature at 120 r.p.m. for 5 minutes, followed by charging 750 ml of the solution obtained in the step A of Example 27 in 30 minutes. 250 ml of THF and 20 ml of isopropanol were further charged into the mixture and agitated at an elevated agitation rate of 180 r.p.m., followed by heating up to 60° C. in 15 minutes and keeping at that temperature for 45 minutes.

The slurry after the reaction was transferred under nitrogen sealing conditions to a 5 liter filter equipped with an agitator, a condenser, a thermometer and a nitrogen sealing line and having a heating jacket and a filter unit at the bottom thereof, and subjected to filtration, followed by washing twice with 500 ml of toluene. 500 ml of $TiCl_4$ and 500 ml of toluene were added to the solid product (II) in the filter and maintained at 135° C. for 1 hour at 180 r.p.m. This was filtered, to which 500 ml of $TiCl_4$, 10.5 ml of di-n-butyl phthalate and 1000 ml of toluene were added, followed by keeping at 135° C. at 180 r.p.m. for 1.5 hours and filtration.

1000 ml of $TiCl_4$ was further added to the resultant solid product (IV) and heated under reflux for 10 minutes, followed by filtration and washing three times with 500 ml of toluene and four times with 500 ml of hexane. The solid product (IV) left in the filter was dried in a stream of hot nitrogen at approximately 60° C. to obtain 51.0 g of a catalyst.

The analysis of the solid product (IV) revealed 18.5% of Mg, 2.35 of Ti, 56.6% of Cl and 7.1% of di-n-butyl phthalate. The average particle size of the solid product (IV) was 45.2μ and the content of the particles having a size not larger than 5μ was 0.2%.

COMPARATIVE EXAMPLE 10

The general procedure of Example 27 was repeated except that in the step C, isopropanol was not used, thereby obtaining 16.9 g of solid product (IV). The average size of the solid product (IV) was 32.8μ and the content of the particles having a size not larger than 5μ was 2.1%.

COMPARATIVE EXAMPLE 11

The general procedure of Example 27 was repeated except that 20 ml of tetraethoxysialne was used instead of the boron compound in the step B, thereby obtaining 16.8 g of solid product (IV). The average size of the solid product was 22.4μ and the content of the particles having 5μ was 5.6%.

Evaluation on the Vapor Phase Polymerization

The solid products (IV) obtained in Examples 28 to 33 and Comparative Examples 10 and 11 were used for carrying out the vapor phase polymerization in the same manner as in Example 27. The results are shown in Table 7. The size distribution of polymers obtained in Example 27 and with respect to Comparative Examples 10 and 11 are shown in Table 8.

EXAMPLE 34

The general procedure of Example 27 was repeated except that 15 ml of $TiCl_4$ and 5 ml of $SiCl_4$ were used as a precipitating agent in the step B of Example 28 and a mixed alcohol of 2 ml of isopropanol and 2 ml of ethanol was used, thereby obtaining 7.3 g of solid product (IV). The solid product had an average particle size of 36.5μ and the content of the particles having a size not larger than 5μ was 0.7%.

EXAMPLE 35

The general procedure of Example 27 was repeated except that 60 ml of tetrahydropyran was used instead of 50 ml of THF in the step C of Example 27, thereby obtaining 9.3 g of solid product (IV). The solid product had an average particle size of 35.8μ and the content of the particles having a size not larger than 5μ was 0.8%.

EXAMPLE 36

The general procedure of Example 27 was repeated except that 24 ml of isobutyl borate was used instead of 20 ml of n-butyl borate and 60 ml of 2-methyltetrahydrofuran was used instead of 50 ml of THF in the step C of Example 27, thereby obtaining 8.5 g of solid product (IV). The solid product had an average particle size of 36.1μ and the content of the particles having a size not larger than 5μ was 0.7%.

COMPARATIVE EXAMPLE 12

The general procedure of Example 35 was repeated except that there was not used the alcohol in the step C of Example 35, thereby obtaining 17.3 g of solid product (IV). The solid product had an average particle size of 25.1μ and the content of the particles having a size not larger than 5μ was 7.2%.

COMPARATIVE EXAMPLE 13

The general procedure of Example 36 was repeated except that there was not used the alcohol in the step C of Example 35, thereby obtaining 16.7 g of solid product (IV). The solid product had an average particle size of 27.1μ and the content of the particles having a size not larger than 5μ was 6.2%.

EVALUATION ON SLURRY POLYMERIZATION

The catalysts (solid products (IV)) obtained in Examples 34 to 36 and Comparative Examples 12 to 13 were used for carrying out hexane slurry polymerization of propylene.

1000 ml of hexane was charged into a 1.5 liter autoclave, to which 2 mmols of TEA, 0.2 mmols of diphenyldimethoxysilane and from 15 mg to 17 mg of each catalyst were added, followed by introduction of 60 ml of hydrogen, keeping the pressure at 7 kg/cm²G by the addition of propylene and polymerizing propylene at 70° C. for 2 hours. After completion of the polymerization reaction, the monomer gas was purged and 50 g of methanol was added to the reaction system, which was subsequently agitated at 70° C. for 10 minutes and subjected to filtration. The resultant polymer was dried and the yield of the polymer based on the amount of the catalyst used was calculated. The polymer dissolved in the hexane was collected from the filtrate. The results are shown in Table 9.

EXAMPLE 37

The catalyst obtained in Example 27 was used to carry out bulk polymerization.

2 mmols of TEA, 0.3 mmols of phenyltriethoxysilane, 10 mg of the catalyst and 300 ml of hydrogen were charged into a 1 liter bulk polymerization vessel along with 500 g of propylene, followed by polymerization at 70° C. under a pressure of 35 kg/cm²G for 30 minutes. Unreacted propylene monomer was purged to obtain 170 g of a dry powder. The yield of the polymer per g of the catalyst was 28,000 g and the remaining rate after extraction with n-heptane reflux for 6 hours was 98.5% with an MFR value of 7.8 and an apparent bulk density of the polymer of 0.50 g/cm³.

EXAMPLE 38

10 mg of the catalyst obtained in Example 33 was used to carry out the bulk polymerization for 20 minutes in the same manner as in Example 37, after which unreacted propylene was purged and a mixed gas of propylene/ethylene=2/1 and 150 ml of hydrogen gas were fed for vapor phase polymerization at 70° C. at 18 kg/cm²G for 30 minutes. The yield of the polymer was 192 g with a T-MFR value of 1.4, and the content of ethylene in the polymer was 10.3%.

EXAMPLE 39

16.5 mg of the catalyst obtained in Example 33, 2 mmols of TEA, 0.2 mmols of diphenyldimethoxysilane and 150 ml of hydrogen were charged into a polymerization vessel as used in Example 27 along with propylene monomer, followed by feeding a mixed gas of propylene/ethylene=4/1 for copolymerization at 70° C. at 22 kg/cm²G for 1 hour. The yield of the polymer was 217 g and the content of the ethylene in the polymer was 50%.

TABLE 7

| Example Comp. example No. | Result of Vapor phase Polymerization | | | |
|---|---|---|---|---|
| | Catalyst activity (g-pp/g-Cat.) | C₇ Extruction residue rate (%) | MFR (g/10 min) | Polymer apparent Bulk density (g/cm³) |
| Example | | | | |
| 28 | 23700 | 98.9 | 2.8 | 0.48 |
| 29 | 21000 | 98.5 | 3.6 | 0.46 |
| 30 | 22100 | 98.7 | 3.0 | 0.45 |
| 31 | 19500 | 97.9 | 4.1 | 0.44 |
| 32 | 23900 | 99.0 | 3.7 | 0.47 |
| 33 | 24700 | 98.9 | 3.1 | 0.48 |
| Comp. example | | | | |
| 10 | 24000 | 98.8 | 2.6 | 0.46 |
| 11 | 17500 | 97.6 | 6.1 | 0.41 |

TABLE 8

| | Polymer Particle size distribution obtained by Vapor phase polimerization | | |
|---|---|---|---|
| | Example 27 (%) | Comp. example 10 (%) | Comp. example 11 (%) |
| Powder diameter | | | |
| 2000μ< | 8.3 | 0.0 | 0.0 |
| 1400-2000μ | 50.1 | 3.7 | 0.6 |
| 1000-1400μ | 37.9 | 41.5 | 7.5 |
| 710-1000μ | 2.6 | 33.2 | 39.2 |
| 500-710μ | 0.6 | 17.3 | 34.7 |
| 355-500μ | 0.3 | 2.6 | 12.5 |
| 250-355μ | 0.1 | 0.7 | 2.3 |
| 180-250μ | 0.1 | 0.6 | 0.9 |
| 106-180μ | 0 | 0.3 | 1.3 |
| <106μ | 0 | 0.1 | 1.0 |
| Average diameter (μ) | 1490μ | 952μ | 691μ |

TABLE 9

| Example Comp. example No. | Catalyst activity (g-PP/g-Cat.) | $nC_6$ Dissolutive material (%) | $nC_7$ Extruction residue rate (%) | MFR (g/10 min) | Polymer apparent Bulk density (g/cm$^3$) |
|---|---|---|---|---|---|
| Example | | | | | |
| 34 | 11000 | 0.35 | 99.43 | 4.0 | 0.48 |
| 35 | 7800 | 0.36 | 99.25 | 4.1 | 0.46 |
| 36 | 10800 | 0.83 | 97.21 | 3.6 | 0.46 |
| Comp. example | | | | | |
| 12 | 7400 | 0.35 | 99.29 | 3.2 | 0.41 |
| 13 | 10300 | 2.60 | 94.21 | 4.8 | 0.44 |

EXAMPLE 40

Step A: Formation of a Magnesium Carbonate Solution 230 g of magnesium ethoxide, 415 ml of 2-ethyl-1-hexanol and 1650 ml of toluene were charged into a 3 liter autoclave equipped with an agitator, a pressure gage and a thermometer and purged with highly pure nitrogen.

The mixture was heated at 90° C. for 3 hours while agitating at 500 r.p.m. in the presence of carbon dioxide. The resultant solution was cooled and the carbon dioxide gas was purged, followed by handling substantially at an atmospheric pressure. The solution contained 0.1 g/ml of magnesium ethoxide.

Step B: Formation of Solid Particles 300 ml of toluene, 19 ml of TiCl$_4$ and 25 ml of hexamethyldisiloxane were charged into a 1500 ml baffled flat bottom flask (baffling rate of 0.15) equipped with an agitator, a thermometer, a condenser and a sealing line for nitrogen and mixed at room temperature at 300 r.p.m. for 5 minutes. Thereafter, 150 ml of the solution obtained in Step A was charged in 10 minutes. Immediately after the charging, solid particles (I) were precipitated.

Step C: Re-precipitation of Solid Particles

To the solution were added 3 ml of ethanol and 50 ml of tetrahydrofuran (THF) by the use of a syringe. The mixture was heated to 60° C. within 15 minutes while agitating at 300 r.p.m. The precipitated particles started to be dissolved in the THF solution and then started to be re-precipitated within 15 minutes. Formation of the solid was completed within 10 minutes. After continuing the agitation at 60° C. for 45 minutes, the agitation was stopped to cause the resultant solid (II) to be settled down. The supernatant liquid was removed by decantation and the remaining solid (II) was washed twice with 200 ml of toluene.

Step D: Treatment with Titanium (IV) Compound

To the solid (II) obtained in Step D were added 200 ml of toluene and 100 ml of TiCl$_4$. While agitating at 600 r.p.m., the mixture was heated to 135° C. within 20 minutes, at which it was kept for 1 hour. The agitation was stopped to cause solid (III) to be precipitated, followed by removal of a supernatant liquid by decantation.

100 m of TiCl$_4$, 250 ml of toluene and 2.1 ml of diisobutyl phthalate were added to the solid (III), and the mixture was agitated at 600 r.p.m. at 135° C. for 1.5 hours. The supernatant liquid was removed by decantation.

200 ml of TiCl$_4$ was added to the residue and heated under reflux for 10 minutes while agitating at 600 r.p.m. The supernatant liquid was removed by decantation and the residue was washed three times with 200 ml of toluene and then four times with 200 ml of hexane.

As a result, there was collected 11.6 g in total of solid product (IV). The solid product (IV) had an average size of 37.2 μ with a fine powder having a size not larger than 5 μ being contained in an amount of 0.2%. The results of analysis revealed that the product had 17.3% of magnesium, 2.3% of titanium, 55.6% of chlorine and 8.6% of di-n-butyl phthalate.

Vapor Phase Polymerization 2 mmols of triethyl aluminium, 0.3 mmols of diphenyldimethoxysilane, 16.0 mg of the solid product (IV) and 0.8 liters of hydrogen were charged into a stainless steel reactor which was purged with nitrogen, had an inner capacity of 3 liters and had a multi-stage agitator. Thereafter, propylene was continuously introduced at 70° C. so that a total pressure was kept at 22 kg/cm$^2$G and polymerized for 2 hours. Subsequently, unreacted propylene was discharged to obtain 382 g of powdery polypropylene. Most polypropylene particles were made of inclined hexagonal columnar shaped crystals. The extraction residue of the polymer with boiling n-hexane for 6 hours was 0.8% and the polymer had a bulk density of 0.48 g/cm$^3$.

EXAMPLE 41

The general procedure of Example 40 was repeated except that 150 ml of the solution obtained in Step A of Example 40 was used, 100 ml of toluene, 100 ml of chlorobenzene and 32 ml of hexamethylcyclotrisiloxane were used in Step B, 40 ml of THF was used in Step C, and for the third treatment with TiCl$_4$ in Step D, 200 ml of TiCl$_4$ was used as the solvent and the mixture was kept at 125° C. for 1 hour, thereby obtaining 12.7 g of solid product (IV). The solid product had an average size of 30.5 μ and the content of particles with a size not larger than 5 μ was 0.7%.

EXAMPLE 42

The general procedure of Example 40 was repeated except that a 1 liter autoclave was used for the reactions of Step B and the subsequent steps, 170 ml of the solution obtained in Step A of Example 1 was used in Step B along with 200 ml of toluene, 28 ml of hexamethyl-1,5-diethoxytrisiloxane, 70 ml of THF was used in Step C and the procedure ranging from Step B to Step C was effected under agitation at 400 r.p.m. at a controlled pressure of carbon dioxide of 1 kg/cm$^2$G, and for the second treatment with TiCl$_4$ in Step D, 2.1 ml of diisobutyl phthalate was used instead of the di-n-butyl phthalate, thereby obtaining 21.0 g of solid product (IV). The product had an average size of 33.2 μ and the content of particles with a size of not larger than 5 μ was 1.8%. The results of analysis for the solid product revealed that the product contained 18.3% of Mg, 2.5% of Ti, 55.9% of Cl and 7.8% of diisobutyl phthalate.

EXAMPLE 43

The general procedure of Example 40 was repeated except that 150 ml of the solution obtained in Step A of Example 40 was used, 150 ml of toluene, 50 ml of chlorobenzene and 36 ml of octaethoxy-1,5-dimethyltetrasiloxane were used in Step B, and 60 ml of THF was used in Step C, thereby obtaining solid product (IV). This product had an average size of 25.3 μ and the content of particles with a size not larger than 5 μ was 0.2%.

EXAMPLE 44

The general procedure of Example 40 was repeated except that 114 ml of the solution obtained in Step A was used in Step B of Example 40 along with 140 ml of toluene, 60 ml of iso-paraffin (Isober G), 14 ml of TiCl$_4$ and 22 ml of hexamethyldisiloxane, 27 ml of THF was used in Step C, and the treatment with TiCl$_4$ was effected by two stages in Step D where the third washing with TiCl$^4$ was not performed, thereby obtaining 10.6 g of solid product (IV). The solid product (IV) had an average size of 22.8 μ and the content of particles having a size of not larger than 5 μ was 0.5%.

EXAMPLE 45

The general procedure of Example 40 was repeated except that 286 g of magnesium propoxide was used instead of magnesium ethoxide and 283 ml of 2-ethyl-1-hexanol was used in Step A, thereby obtaining 12.2 g of solid product (IV). The solid product (IV) had an average size of 27.5 μ and the content of particles having a size of not larger than 5 μ was 1.2%.

EXAMPLE 46

One liter of toluene, 200 ml of hexamethyldisiloxane and 100 ml of TiCl$_4$ were charged into a 5 liter reactor having an agitator, a thermometer, a condenser, a sealing line for nitrogen and a feed line for starting materials along with a heating jacket and four flat baffles provided therein (baffling rate of 0.15), and agitated at room temperature at 120 r.p.m. for 5 minutes, followed by charging 500 ml of the solution obtained in Step A of Example 40 in 30 minutes. Thereafter, 250 ml of THF was charged into the mixture and the agitation speed was raised to 180 r.p.m., followed by heating to 60° C. within 15 minutes and keeping the temperature for 45 minutes.

The slurry obtained after the reaction was transferred, under nitrogen-sealing conditions, into a five liter filter equipped with an agitator, a condenser, a thermometer, a sealing line for nitrogen and a heating jacket and having a filter unit, followed by filtration and washing twice with 500 ml of toluene.

500 ml of TiCl$_4$ and 500 ml of toluene were added to the solid product (II) in the filter and kept at 135° C. at 180 r.p.m. for 1 hour. The mixture was filtered, after which 500 ml of TiCl$_4$, 10.5 ml of di-n-butyl phthalate and 1000 ml of toluene were added and kept at 135° C. at 180 r.p.m. for 1.5 hours, after which it was filtered.

1000 ml of TiCl$_4$ was added to the resultant solid product (IV) and refluxed under heating conditions for 10 minutes, followed by washing three times with 500 ml of toluene and then four times with 500 ml of hexane. The solid product (IV) left in the filter was dried by passing a hot nitrogen stream of approximately 60° C. to obtain 82.2 g of the catalyst.

The results of analysis revealed that the solid product (IV) contained 18.7% of Mg, 2.6% of Ti, 56.2% of Cl and 6.2% of di-n-butyl phthalate. The solid product (IV) had an average size of 45.1 μ and the content of the particles having a size of not larger than 5 μ was 0.4%.

COMPARATIVE EXAMPLE 14

The general procedure of Example 40 was repeated except that any alcohol was not used in Step B of Example 40, thereby obtaining 11.7 g of solid product (IV). In this case, a long time was required for precipitation after which decantation had to be effected over Steps C to D, resulting in a loss of part of fine particles. The content of fine particles with a size of not larger than 5 μ in the resultant solid product (IV) was as high as 4.5%.

In the same manner as in Example 1 using the above solid product (IV), vapor phase polymerization of propylene was performed.

COMPARATIVE EXAMPLE 15

The general procedure of Example 40 was repeated except that any alcohol and any siloxane compound were not used in Step B of Example 40, thereby obtaining 12.3 g of solid product (IV). The content of particles having a size of not larger than 5 μ in the solid product (IV) was 39.2%.

In the same manner as in Example 40 using the above solid product (IV), vapor phase polymerization of propylene was performed.

The results on the size distribution of the polymers obtained in Example 40 and Comparative Example 14 are shown in Table 10.

COMPARATIVE EXAMPLE 16

The general procedure of Example 43 was repeated except that in Step B of Example 43, 20 ml of trimethylchlorosilane was used instead of the siloxane compound.

Evaluation on Vapor Phase Polymerization

The solid products (IV) obtained in Examples 41 to 46 and Comparative Examples 14 to 16 were used to carry out vapor phase polymerization in the same manner as in Example 40. The results are shown in Table 11.

EXAMPLE 47

The general procedure of Example 40 was repeated except that in Step B of Example 40, 10 ml of dimethyldiethoxysilane was used along with 20 m of hexamethyldisiloxane, thereby obtaining 12.9 g of solid product (IV). The solid product (IV) had an average size of 35.2 μ and the content of particles having a size of not larger than 5 μ was 2.0%.

EXAMPLE 48

The general procedure of Example 40 was repeated except that in Step C of Example 40, 60 ml of tetrahydropyran was used instead of 50 ml of THF, thereby obtaining 10.9 g of solid product (IV). The solid product (IV) had an average size of 21.9 μ and the content of particles having a size of not larger than 5 μ was 6.3%.

EXAMPLE 49

The general procedure of Example 40 was repeated except that in Step C of Examples 40, 32 ml of dimethylpolysiloxane having a viscosity of 10 cps was used instead of 25 ml of hexamethyldisiloxane and 60 ml of 2-methyltetrahydrofuran was used instead of 50 ml of THF, thereby obtaining 13.1 g of solid product (IV). The solid product (IV) had an average size of 29.8 μ and the content of particles having a size of not larger than 5 μ was 2.7%.

COMPARATIVE EXAMPLE 17

The general procedure of Example 48 was repeated except that hexamethyldisiloxane and any alcohol were not used in Step B of Example 48, thereby obtaining 10.5 g of solid product (IV).

The solid product (IV) contained a large quantity of fine particles and the content of fine particles with a size of not larger than 5 μ was 29.7%.

COMPARATIVE EXAMPLE 18

The general procedure of Example 49 was repeated except that any siloxane compound was not used in Step B of Example 49, thereby obtaining 13.6 g of solid product (IV).

The solid product (IV) contained a large quantity of fine particles and the content of fine particles with a size of not larger than 5 μ was 11.3%.

Evaluation on Slurry Polymerization

The catalysts (solid products (IV)) obtained in Examples 47 to 49 and Comparative Examples 17 and 18 were used to carry out the hexane slurry polymerization of propylene.

100 ml of hexane was charged into a 1.5 liter autoclave, to which 2 mmols of TEA, 0.2 mmols of diphenyldimethoxysilane and from 15 to 17 mg of each catalyst were added, followed by introduction of 60 ml of hydrogen and polymerization of propylene at 70° C. for 2 hours while keeping the pressure of propylene at 7 kg/cm²G. After completion of the reaction, the monomer gas was purged and 50 g of methanol was added to the reaction system and agitated at 70° C. for 10 minutes, followed by separation by filtration to obtain the polymer. The polymer was dried and its yield per the amount of the catalyst used was calculated. The polymer dissolved in the hexane was collected from the filtrate. The results are shown in Table 3.

EXAMPLE 50

The catalyst obtained in Example 41 was used for bulk polymerization.

2 mmols of TEA, 0.3 mmols of phenyltriethoxysilane, 9 ml of the catalyst and 300 ml of hydrogen were charged into a one liter bulk polymerization vessel along with 500 g of propylene, followed by polymerization at 70° C. for 30 minutes at a pressure of 35 kg/cm²G. Unreacted propylene monomer were purged to obtain 227 g of a dried powder. The yield of the polymer per g of the catalyst was 25,300 g. The percent extraction determined by refluxing with hexane for 6 hours was 0.8% and the apparent bulk density of the polymer was 0.49 g/cm³.

EXAMPLE 51

10 mg of the catalyst obtained in Example 46 was used for bulk polymerization for 20 minutes in the same manner as in Example 50, after which unreacted propylene was purged. Thereafter, a mixed gas of propylene/ethylene=2/1 and 150 ml of hydrogen gas were introduced for carrying out vapor phase polymerization at 70° C. for 30 minutes at a pressure of 18 kg/cm²G. The yield of the polymer was 187 g and the ethylene content in the polymer was 11.5%.

EXAMPLE 52

15 mg of the catalyst obtained in Example 46, 2 mmols of TEA, 0.2 mmols of diphenyldimethoxysilane and 150 ml of hydrogen were charged into a polymerization vessel as used in Example 40, into which a mixed gas of propylene/ethylene=4/1 was introduced, followed by copolymerization of propylene-ethylene at 70° C. for 1 hour at a pressure of 22 kg/cm²G. The yield of the polymer was 169 g and the ethylene content in the polymer was 48%.

TABLE 10

| Size Distribution of Polymers Obtained By Vapor Phase Polymerization | | | |
|---|---|---|---|
| Powder Size | Example 40 (%) | Comp. Ex. 14 (%) | Comp. Ex. 15 (%) |
| 2000μ< | 0.0 | 0.0 | 0.0 |
| 1400–2000μ | 12.6 | 0.3 | 0.0 |
| 1000–1400μ | 67.5 | 8.7 | 3.5 |
| 710–1000μ | 18.0 | 37.4 | 11.9 |
| 500–710μ | 1.6 | 36.5 | 13.8 |
| 355–500μ | 0.2 | 11.7 | 9.4 |
| 250–355μ | 0.2 | 3.0 | 6.7 |
| 180–250μ | 0.1 | 0.7 | 14.4 |
| 106–180μ | 0 | 1.0 | 15.2 |
| <106μ | 0 | 0.7 | 25.1 |
| Average Size (μ) | 1162 | 686 | 225 |

TABLE 11

| Results of Vapor Phase Polymerization | | | | |
|---|---|---|---|---|
| Example No. | Catalytic Activity (g-PP/ g-Cat) | Extraction Residue with C₇ (%) | MFR (g/10 min.) | Apparent Bulk Density of Polymer (g/cm³) |
| Ex. | | | | |
| 41 | 23600 | 99.0 | 3.5 | 0.46 |
| 42 | 24000 | 98.8 | 3.3 | 0.47 |
| 43 | 21700 | 99.3 | 4.8 | 0.47 |
| 44 | 22000 | 98.1 | 4.2 | 0.46 |
| 45 | 22900 | 98.6 | 3.1 | 0.47 |
| 46 | 24100 | 99.1 | 3.9 | 0.49 |
| Comp. Ex. | | | | |
| 14 | 21700 | 98.4 | 4.2 | 0.45 |
| 15 | 16800 | 97.6 | 5.3 | 0.39 |
| 16 | 22300 | 98.7 | 3.6 | 0.38 |

TABLE 12

| | Results of Vapor Phase Polymerization | | | | |
|---|---|---|---|---|---|
| Example No. | Catalytic Activity (g-PP/g-Cat) | Dissolution Rate in $_nC_6$ (%) | Extraction Residue with $C_7$ (%) | MFR (g/10 min.) | Apparent Bulk Density of Polymer (g/cm$^3$) |
| Ex. | | | | | |
| 47 | 11200 | 0.32 | 99.13 | 3.6 | 0.48 |
| 48 | 8500 | 0.87 | 99.22 | 3.7 | 0.46 |
| 49 | 8300 | 0.72 | 98.61 | 3.2 | 0.45 |
| Comp. Ex. | | | | | |
| 17 | 8100 | 0.40 | 98.87 | 4.3 | 0.41 |
| 18 | 8700 | 1.67 | 96.84 | 5.7 | 0.43 |

What is claimed is:

1. A catalytic ingredient for use in the polymerization of olefins which comprises a carrier comprising a magnesium compound precipitated from solution and a catalytic component supported on the carrier and which is a titanium halide, vanadyl halide or vanadium halide, the catalyst being obtained by a process which comprises the steps of:

(A) mixing (a) one or more magnesium compounds of the formulae $Mg(OR^1)_n$ $(OR^2)_{2-n}$ and/or $MgR_m^3(OR^4)_{2-m}$ (in which $R^1$, $R^2$, $R^3$ and $R^4$ are the same or are different and each is a $C_1$-$C_{20}$ alkyl group, an allyl group, a $C_3$-$C_{20}$ cycloalkyl group or a $C_5$-$C_{20}$ aromatic group; and m and n are the same or are different and each have a value of from 0 to 2), with (c) a saturated or unsaturated monohydric alcohol of the general formula, $R^5OH$ (in which $R^5$ is a $C_1$-$C_{20}$ alkyl group, allyl group, a $C_3$-$C_{20}$ cycloalkyl group, or a $C_5$-$C_{20}$ aromatic group), or a polyhydric alcohol having from 1 to 20 carbon atoms, for reaction in solution in the presence of (b) carbon dioxide in an inert hydrocarbon solvent, to obtain component (A);

(B) subjecting component (A) to mixing and reaction with component (d) comprising a titanium halide of the formula $TiX_p(OR^6)_{4-p}$ and/or a vanadyl halide of the formula $VOX_q(OR^7)_{3-q}$ and/or a vanadium halide of the formula $VX_r(OR^8)_{4-r}$ and/or a silane halide of the formula $SiX_s(OR^9)_{4-s}$ (in which X is Cl or Br; each of $R^6$, $R^7$, $R^8$ and $R^9$ is a $C_1$-$C_{20}$ alkyl group, an allyl group or $C_3$-$C_{20}$ cycloalkyl group; each of p, r and s is an integer of from 1 to 4; and q is an integer of from 1 to 3); together with (e) a boron compound of the formula $BR^{10}_t$ $(OR^{11})_{3-t}$ (in which $R^{10}$ and $R^{11}$ are each a $C_1$-$C_{20}$ alkyl group, or allyl group, a $C_3$-$C_{20}$ cycloalkyl group or a $C_5$-$C_{20}$ aromatic group; and t has a value of from 0 to 3), or a silane compound of the formula $R^{10}_tSi(OR^{11})_{4-t}$ (in which $R^{10}$ and $R^{11}$ are each as defined above) or a siloxane compound having a bond of Si—O—Si or a mixture thereof with a silane compound of the formula $R^{10}_tSi(OR^{11})_{4-t}$ (in which $R^{10}$ and $R^{11}$ are each a $C_1$-$C_{20}$ alkyl group, an allyl group or a $C_{3-20}$ cycloalkyl group and t has a value of 0 to 4), thereby giving solid product (I);

(C) reacting solid product (I) with (g) a $C_{1-20}$ saturated or unsaturated mono-or polyhydric alcohol of the formula $R^{12}OH$ and a cyclic ether thereby causing dissolution and reprecipitation to give solid product (II); and (D) subjecting solid product (II) to further reaction with a component (h) consisting of a titanium halide and/or a vanadyl halide and/or a vanadium halide as defined in (d) above to thereby give solid product (III): followed by further reaction of (III) with a mixture of component (d) and an electron donor (j) thereby obtaining solid product (IV) for use as the catalytic component.

2. A catalytic ingredient according to claim 1 wherein the molar ratio of titanium to magnesium is from 0.5:1 to 10:1 and the molar ratio of the electron donor to titanium is from 0.2:1 to 20:1.

3. A catalytic ingredient according to claim 1 wherein in step (C) $R^{12}$ in the $R^{12}OH$ is a $C_1$-$C_{20}$ alkyl group, allyl group, a $C_3$-$C_{20}$ cycloalkyl or $C_5$-$C_{20}$ aromatic group.

4. A catalytic ingredient according to claim 1 wherein the molar ratio of Si in the silane compound used in step (B) and Mg in component (A) is from 0.1/1 to 2.0/1.

5. A catalytic ingredient according to claim 4 wherein the molar ratio of the total metals in the titanium halide, vanadyl halide, vanadium halide and/or silane halide to the Mg in component (A) is from 1/0.3 to 20/1.

6. A catalytic ingredient according to claim 1 wherein the molar ratio of B in the boron compound in step (B) to Mg in component (A) is from 0.1/1 to 2.0/1.

7. A catalytic ingredient according to claim 1 wherein the molar ratio of Si in the siloxane compound or the mixture of the siloxane compound and the silane compound in step (B) to Mg in component (A) is from 0.1:1 to 2.0:1.

8. A catalytic ingredient according to claim 1 wherein the alcohol in Step (C) is a $C_2$-$C_{20}$ linear alcohol.

9. A catalytic ingredient according to claim 1 wherein the cyclic ether in step (C) is tetrahydrofuran.

10. A catalytic ingredient according to claim 1 wherein the electron donor is an aromatic mono or polycarboxylic acid ester.

11. A catalytic ingredient according to claim 1 wherein the electron donor material is used in an amount of about 0.0001 to 1.0 mole per gram atom of titanium or vanadium contained in solid product (III).

12. A catalyst for the polymerization of olefins which comprises a catalytic component as set forth in claim 1 together with an organometallic compound.

13. A catalyst as set forth in claim 12 which further includes an electron donor.

* * * * *